United States Patent
Wang

(10) Patent No.: US 10,462,861 B2
(45) Date of Patent: Oct. 29, 2019

(54) ADAPTIVE POWER REGULATION OF LED DRIVER MODULE FOR EMERGENCY LIGHTING

(71) Applicant: Advanced Regulated Power Technology, Inc., Orange, CA (US)

(72) Inventor: Jie Dong Wang, Irvine, CA (US)

( * ) Notice: Subject to any disclaimer, the term of this patent is extended or adjusted under 35 U.S.C. 154(b) by 0 days.

(21) Appl. No.: 16/364,020

(22) Filed: Mar. 25, 2019

(65) Prior Publication Data
US 2019/0230758 A1    Jul. 25, 2019

Related U.S. Application Data

(63) Continuation-in-part of application No. 15/959,101, filed on Apr. 20, 2018, now Pat. No. 10,264,634.

(51) Int. Cl.
| H05B 33/08 | (2006.01) |
| H02J 9/02 | (2006.01) |
| H02J 7/00 | (2006.01) |
| H02M 3/335 | (2006.01) |

(52) U.S. Cl.
CPC ........ *H05B 33/0815* (2013.01); *H02J 7/0068* (2013.01); *H02J 9/02* (2013.01); *H05B 33/0845* (2013.01); *H02M 3/33507* (2013.01); *H05B 33/0824* (2013.01)

(58) Field of Classification Search
CPC .... H05B 33/02; H05B 33/08; H05B 33/0815; H05B 33/0842; H05B 33/0887; H05B 37/02; H02M 3/156
See application file for complete search history.

(56) References Cited

U.S. PATENT DOCUMENTS

| 7,202,640 | B2* | 4/2007 | Morita | H02M 1/4225 323/205 |
| 7,256,569 | B2* | 8/2007 | Wu | G05F 1/70 323/222 |
| 7,671,575 | B1* | 3/2010 | Suzuki | H02M 3/156 323/284 |
| 9,398,649 | B2* | 7/2016 | Wang | H05B 33/0815 |
| 9,961,734 | B2* | 5/2018 | Zhu | H05B 37/02 |
| 10,170,985 | B1* | 1/2019 | Wu | H02M 3/156 |
| 2002/0060559 | A1* | 5/2002 | Umemoto | H02M 3/156 323/282 |
| 2010/0072964 | A1* | 3/2010 | Qiu | H02M 3/156 323/282 |
| 2010/0141174 | A1* | 6/2010 | Negrete | H05B 33/0815 315/294 |
| 2010/0213856 | A1* | 8/2010 | Mizusako | H02M 1/36 315/158 |

(Continued)

FOREIGN PATENT DOCUMENTS

| CN | 102523663 | 5/2014 |
| WO | 201021677 | 2/2010 |

*Primary Examiner* — Jason Crawford
(74) *Attorney, Agent, or Firm* — Cionca IP Law P.C.; Marin Cionca

(57) ABSTRACT

An adaptive power regulation converter for battery powered emergency lighting LED driver is disclosed. The power feedback and power compensation circuits regulate the output power to LED strings and provides tighten regulated constant power and constant lumens for emergency light during power out time. The adaptive power regulation converter can be used for a great range of LED strings.

16 Claims, 16 Drawing Sheets

(56) References Cited

U.S. PATENT DOCUMENTS

| | | | |
|---|---|---|---|
| 2010/0308733 A1* | 12/2010 | Shao | H02M 1/4225 |
| | | | 315/119 |
| 2011/0140630 A1* | 6/2011 | Doudousakis | H02M 3/156 |
| | | | 315/291 |
| 2011/0285301 A1* | 11/2011 | Kuang | H05B 33/0809 |
| | | | 315/200 R |
| 2013/0093356 A1* | 4/2013 | Green | H02M 3/33523 |
| | | | 315/297 |
| 2013/0154487 A1* | 6/2013 | Kuang | H05B 33/0815 |
| | | | 315/171 |
| 2014/0132172 A1* | 5/2014 | Zhu | H05B 37/02 |
| | | | 315/210 |
| 2014/0160809 A1* | 6/2014 | Lin | H02M 3/33523 |
| | | | 363/21.16 |
| 2015/0061521 A1* | 3/2015 | Cohen | H05B 33/0815 |
| | | | 315/200 R |
| 2017/0196052 A1 | 7/2017 | Cao et al. | |
| 2017/0311409 A1* | 10/2017 | Zhu | H05B 33/0887 |
| 2018/0042079 A1* | 2/2018 | Fang | H05B 33/0815 |
| 2018/0048227 A1* | 2/2018 | Kim | H02M 3/073 |
| 2018/0103520 A1* | 4/2018 | Zhu | H05B 33/0887 |

\* cited by examiner

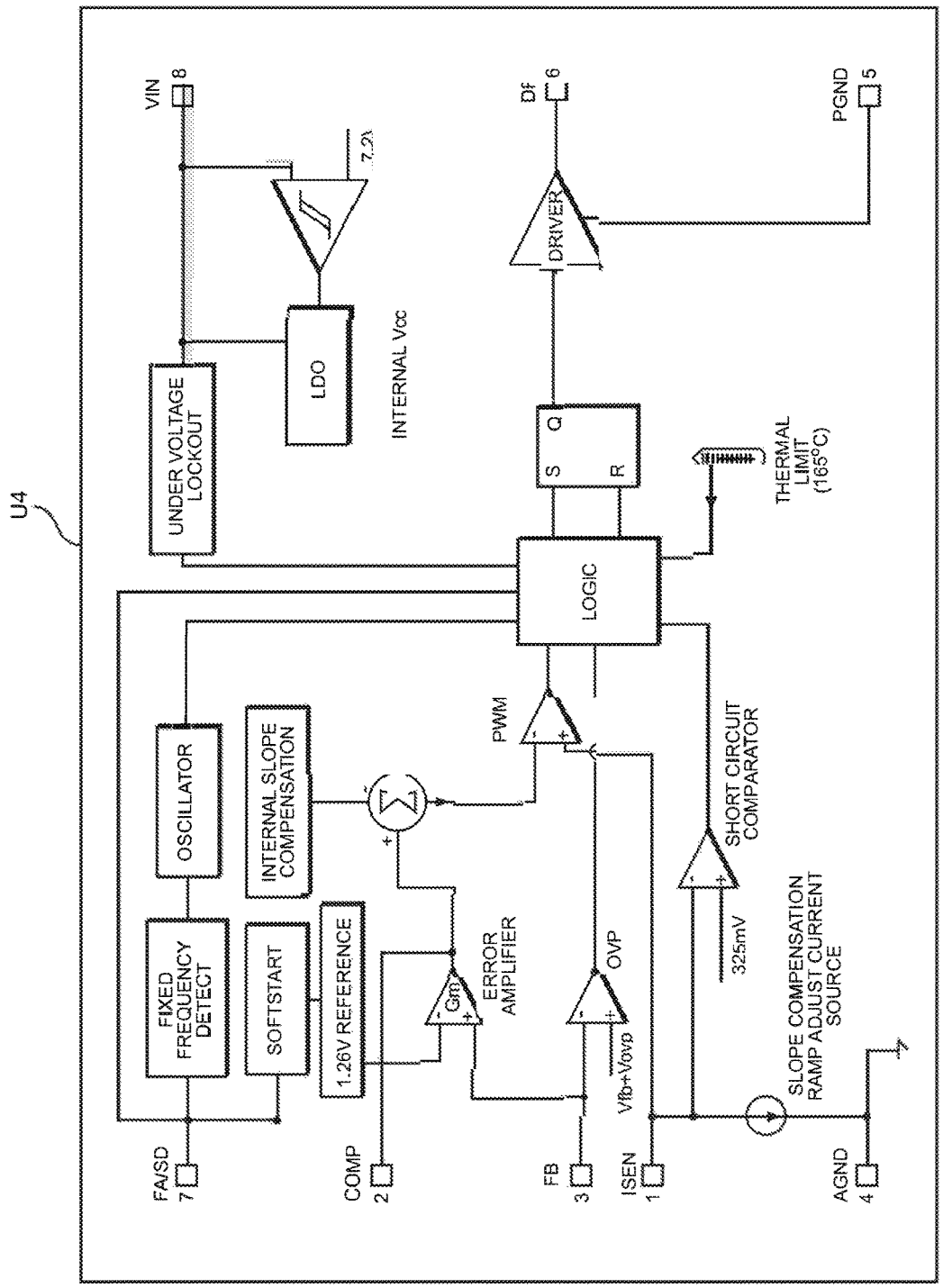
FIG. 3A - Prior Art

ADAPTIVE POWER REGULATION OF LED DRIVER MODULE FOR EMERGENCY LIGHTING

CROSS-REFERENCE TO RELATED APPLICATIONS

This application is a continuation-in-part and claims the benefit of U.S. Non-Provisional application Ser. No. 15/959,101, filed Apr. 20, 2018, which is hereby incorporated by reference.

BACKGROUND OF INVENTION

1. Field of the Invention

The invention relates generally to power regulation and more particularly to precise and adaptive power regulation of LED driver modules and methods for emergency lighting applications.

2. Description of the Related Art

Traditionally, a switching mode power supply is a voltage regulated converter to maintain constant voltage at the output load or a current regulated converter to maintain constant current at the output load. For emergency light systems the load is the lighting output. Most of today's emergency light systems use LEDs as lighting output for best efficiency. It is well known that LED consumes much less power than any other light sources. Since emergency power lighting is powered by back up battery in an emergency event, consuming as little power as possible is critical to extend the life of the light output. However, the government regulation for emergency lighting requires that in an emergency event, the LEDs light output need to provide a certain minimum lumens or brightness for a minimum period of 90 minutes using the backup battery power for the emergency lighting. The best and most optimal solution to meet the above requirement is to supply constant power to the LEDs from the back up battery during the emergency event. However, providing the sufficient minimum lumens for the required period of at least ninety minutes for a wide range of LED strings and different manufacturers of LEDs by using a backup battery system is a great challenge.

Voltage drops on different LED strings is based on the numbers of LED cells in the series of the LED strings and on the type of LED used in the LED strings. The voltage-current (V-I) characteristic of an LED is not linear. A constant voltage converter can be only used for one particular type of LED or LED strings' load. If a different type or a different make of LEDs are used, then the constant voltage converter is insufficiently able to meet the requirements.

The emergency LED light's lumens is according to the battery capacity used, in terms of power. A conventional emergency LED driver is a current-regulated converter which deliver a constant current over a range of load voltages. This results in LED light's lumens gradually increasing from using more LEDs or gradually decreasing from using less LEDs in the emergency lighting system. Using constant current can also results in battery power not being completely used up during the ninety minutes if the lighting system uses less LEDs. This results in wasted left over capacity of the backup battery and is not cost effective and not optimal. On the other hand, if the same lightning system uses more LEDs, the power from back up battery may not last the required minimum 90 minutes of required output lumens. This results in the failure to meet the safety standards and safety testing (e.g., by UL). Therefore, the best solution is to use a constant power to drive the LEDs output instead of using constant voltage or constant current type. Constant power will solve the issues described above.

In the market today, there are companies manufacturing constant power LEDs driver circuit for the emergency lighting system. As an example, a prior art invention which was patented by this inventor, titled "Constant Power Supply for LED Emergency Lighting using Smart Output Resetting Circuit for no Load Condition" and disclosed in U.S. Pat. No. 9,398,649, focuses on inherent property of constant power in discontinuous conducted mode (DCM) flyback converter. In that invention, the primary side power is regulated without feedback from secondary side, which results in rough power regulation. U.S. Pat. No. 9,398,649 teaches that the output power is $0.5*Lp*(Ip^2)*fsw*\eta$, where Lp is transformer primary winding inductance, Ip is the peak primary inductor's current, fsw is flyback converter's switching frequency and $\eta$ is converter's efficiency. Assuming Lp, fsw and q are constant, then regulating Ip can regulate output power. However, in the real world, the transformer primary winding inductance's error tolerance is normally 15% or more. In addition, the Ip sensing resistor could have a 1% error tolerance. The frequency is set by RC (resistor-capacitor) network. It is a common knowledge for those skilled in the art that the RC error could be up to 6%. In U.S. Pat. No. 9,398,649, if the converter efficiency is the same for all unit, the power regulation error is affected by the errors of Lp, Ip, and fsw. The actual output power is $$Po=0.5*(a*Lp)*((b*IP)^2)*(c*fsw)*\eta,$$

where a, b and c are variables. There are factors of these errors of each component. The power error is $$\delta P\% = a*(b^2)*c-1.$$

As an example, if the variable a is 1.15, variable b is 1.01 and variable c is 1.06, then the power regulation error is 24.35%. If the variable a is 0.85, variable b is 0.99 and variable c is 0.94, then power regulation error is −21.69%. Thus, in this example, the power regulation error is in the range of −21.69% to 24.35%. Due to the wide error range, this means that in mass production, manual adjustment of each driver's output power is needed and that significantly increases product cost.

The prior art (U.S. Pat. No. 9,398,649) methods for achieving constant power is limited by poor regulation and therefore the need to do manual tuning of each part during mass production which increases cost. In addition, this prior art teachings are also limited to one topology which is the discontinuous conducted mode flyback converter.

The applicant(s) substantially solved the problems outlined above in the related application, U.S. Non-Provisional application Ser. No. 15/959,101 ("'101 application"). However, some potential drawbacks regarding reliability and manufacturing costs may be present in the circuits disclosed in the '101 application. For example, the voltage potential of the LED's load return line of the emergency lighting system ("'101 EM system") of the '101 application and the voltage potential of the LED's load return line of an external AC driver may be different, resulting in a less reliable emergency lighting system. In other words, the circuit's secondary ground of the '101 EM system and the circuit's secondary ground of the external AC driver may be different, which may cause the external AC driver to shut down due to ground bouncing. To solve the voltage potential difference additional components, such as two relays, may need to be added to the circuit, resulting in higher manufacturing cost.

A second potential drawback could be found in the current sensing circuit of the '101 application. The output current sense signal may have a bigger frequency spike and ripple from the power MOSFET switch and transformer, i.e., the output current sense signal may not be clean. This potential drawback could result in the compensation circuit becoming unstable and cause circuit oscillation, thus the circuit may be less reliable. Another potential drawback found in the '101 application may be that the output current sample is referenced to circuit ground and the analog multiplier IC chip U4 inputs, thus the current sample may need to be isolated. Isolating the current sample may require additional components, and thus more cost and power loss in the circuit.

Lastly, a potential drawback of the '101 application may be that the voltage sample may have worse resolution when the LED load is at the lower end of its output voltage range. Thus, the circuit may be less reliable.

Therefore, there is a need for new and improved power regulation systems and methods for emergency lighting applications that address and solve the problems described above.

The aspects or the problems and the associated solutions presented in this section could be or could have been pursued; they are not necessarily the approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

As a background, the regular pulse width modulation integrated circuits (PWM Chip, PWM IC, PWM IC chip) are configured to do output voltage or current regulation of a power converter. This invention teaches the concept of using a regular low cost readily available PWM IC and adapt it to do power feedback and power regulation instead.

In an aspect of the invention, three variations of converter for LED drivers with power sampling, power feedback and power compensation loop are provided. Each uses an analog multiplier which generates power sample signal from samplings of output current and output voltage. The analog multiplier multiplies the two independent components of the output, i.e., output current sampling and output voltage sampling. The product of these two independent components is the output power sampling, in the form of a voltage signal, which, after being scaled down to provide power feedback signal, goes through a power compensation network. The scaled down power sample signal is compared to a precise reference voltage which could be, but is not limited to, an internal reference voltage inside the PWM Chip. If a difference is detected, a power error signal is generated. This power error signal inputs through outer loop and enters the first input of a comparator. In addition, primary current feedback goes through the inner loop to the second input of the same comparator. This is used to control the pulse width of the PWM Chip. These inner loop and outer loop signals are used to generate a PWM signal which turns on and turns off the power MOSFET to achieve a very tight power regulation, for example, but not limited to, a +/−3% of power regulation. This provides a very tight and better adaptive power regulation. The basic concept of using the PWM Chip is well known to those skilled in the art of switch mode power conversion. This invention is to use the same PWM Chip and its internal circuitry to do power feedback and output power regulation instead of the regular output voltage or current regulation.

In another aspect, the power regulated LED driver circuit disclosed herein is versatile because it is not limited to a few topologies and to discontinuous topologies. In fact, the teachings of this invention can be used in Forward, Boost, Buck, Buck-Boost and Flyback topologies with continuous and discontinuous mode, etc.

In another aspect of the invention, three additional variations of LED drivers with power sampling, power feedback, and a power compensation loop are provided. Each variation feeds an input current sample and an input voltage sample to an analog multiplier which generates an input power sample. The input current sample can be inputted directly into the analog multiplier, i.e., no additional components are needed to isolate the signal, which saves manufacturing costs. Another advantage is that, as it will be apparent from the ensuing detailed description, these three additional variations solve the reliability drawbacks described above.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which:

FIG. 3A shows internal detail of a prior art IC chip shown in FIG. 3 as U4.

DETAILED DESCRIPTION

Figure 1:
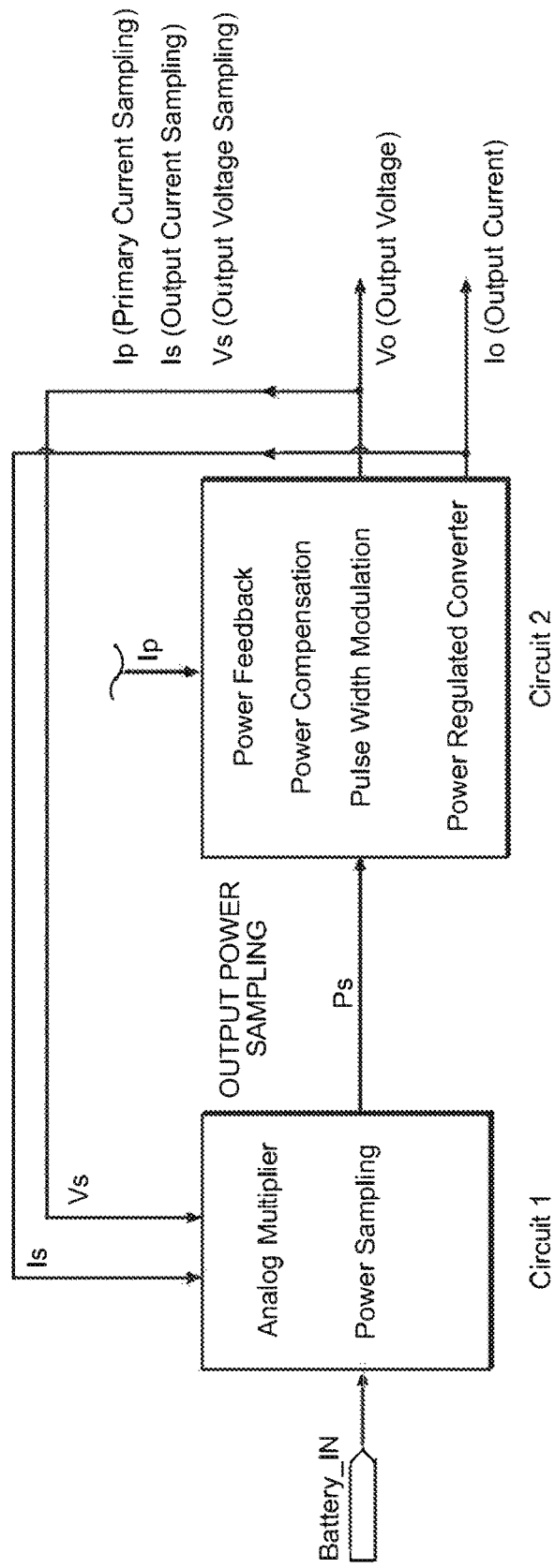
FIG. 1 illustrates a block diagram for a power regulation LED driver circuit, according to an embodiment.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art. Also, as it should be recognized by one of ordinary skills in the art, throughout this description, "u" is used in place of "μ" to represent the prefix micro when referring to measurement units.

FIG. 1 illustrates a block diagram for a power regulation LED driver circuit, according to an embodiment. The structure and function of the elements depicted in FIG. 1 will be readily apparent from the ensuing description referring to FIGS. 2-4. As it will be described in more detail hereinafter, the power regulated LED driver circuit disclosed herein provides constant power to LED strings using power feedback and power compensation network for battery backup powered emergency lighting system. The adaptive power converters described herein use power feedback to adjust power to the LED strings and provides a predetermined constant power and a constant lumen during all lighting backup periods. The adaptive power converters described herein will meet the regulatory requirement of at least 90 minutes of run time while maintaining the minimum lumens requirement in an emergency event. It can be used on a wide variety of LEDs types, and LED strings. The adaptive power converters described herein can be mass produced at a lower cost as it does not require manual tuning of each part during mass production.

Figure 2:
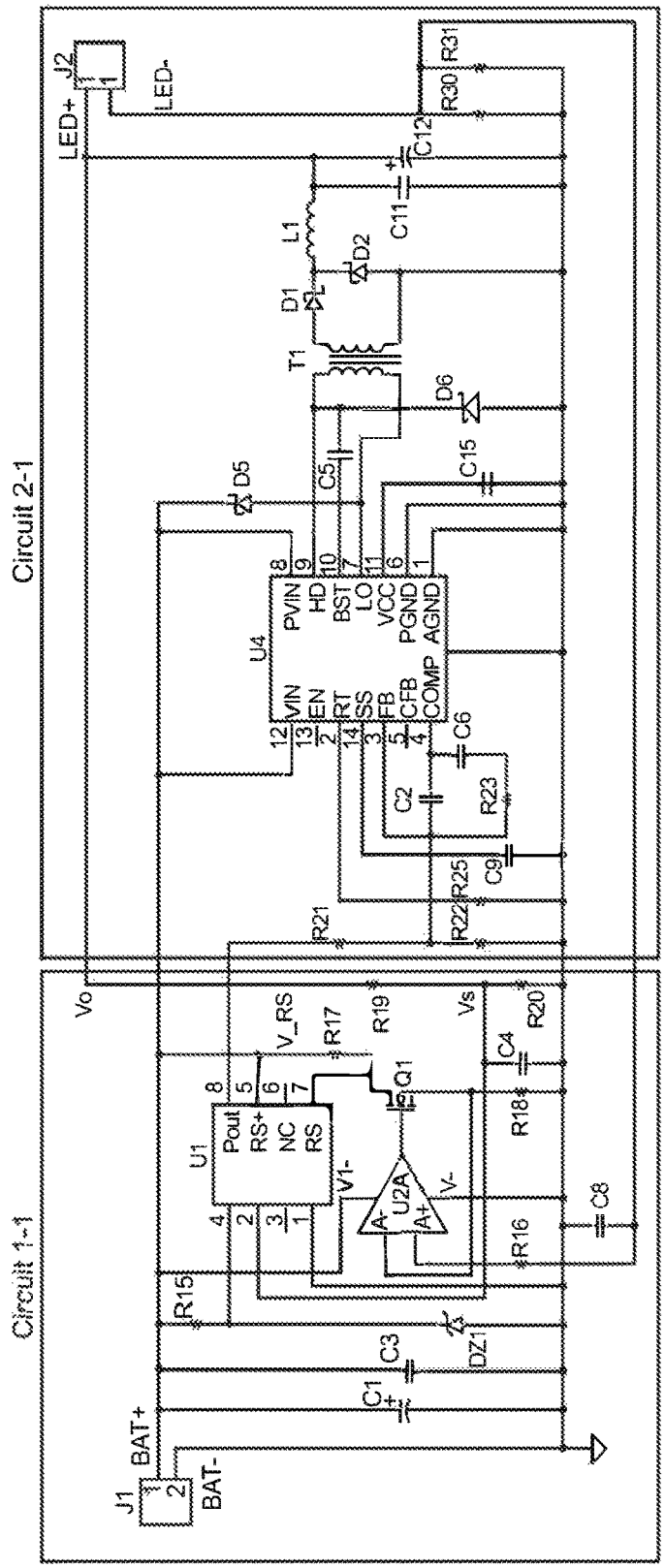
FIG. 2 illustrates a schematic for two switchers Forward regulated power LED driver circuit, according to an embodiment.
Figure 2A:
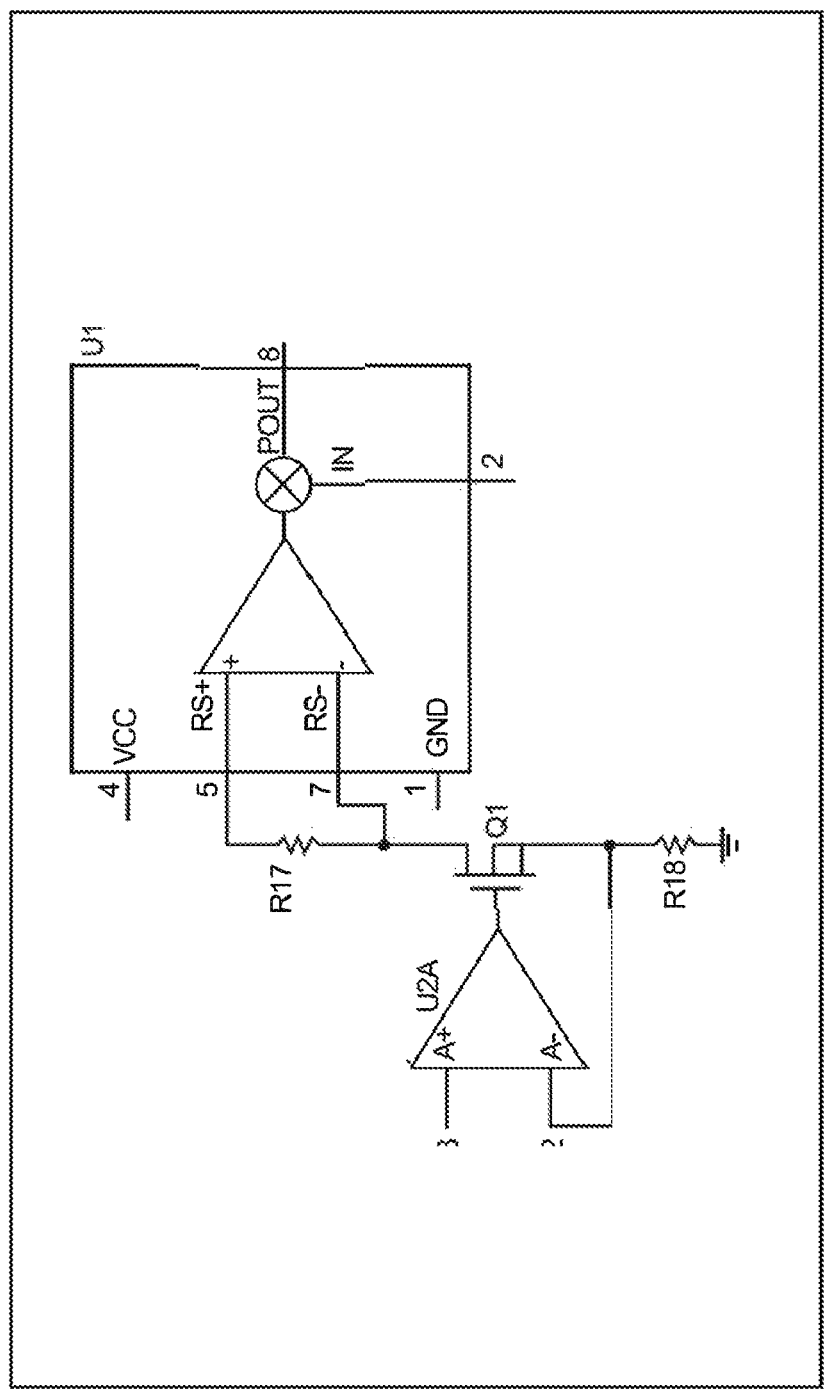
FIG. 2A shows additional detail of Circuit 1 of FIGS. 2, 3 and 4, namely internal detail of an exemplary existing IC chip shown in FIGS. 2, 3 and 4 as U1, and detail of the connection between U1 and Op Amp U2A, according to an aspect.

FIG. 2 illustrates a schematic of a two switchers Forward regulated power LED driver circuit, according to an embodiment. This exemplary embodiment may be configured as a 5 Watts two switchers forward LED Driver with an output voltage range of 14V~58V.

As shown, Circuit 1 of the schematic diagram shown in FIG. 2 may be an analog multiplier circuit for power sensing and power sampling. This analog multiplier circuit may be implemented by using an analog multiplier device, including, but not limited to MAX4210E, or other similar devices that may be constructed by using discreet components and/or integrated circuits (IC). In this example, the analog multiplier device MAX4210E multiplies the samples of output voltage and output current to generate an analog voltage proportional to the output power consumed by the LED load.

Circuit 1 of FIG. 2 is the power signal generator circuit and comprises of the following components: R15 (e.g., 10KΩ), R16 (e.g., 1KΩ), R17 (e.g., 150KΩ), R18 (e.g., 150KΩ), R19 (e.g., 140KΩ), R20 (e.g., 10KΩ), R21 (e.g., 100KΩ), R22 (e.g., 102KΩ), DZ1 (e.g., 5V), U1 (e.g., MAX4210E), U2A (e.g., LM324), Q1 (e.g., MOSFET), C1 (e.g., 820 uF), C3 (e.g., 0.1 uF), C4 (e.g., 0.01 uF) and C8 (e.g., 47 pF). R15 and DZ1 provide 5V linear regulated auxiliary voltage (Vcc) for U1 (e.g., MAX4210E). U1 operates in the positive quadrant to provide positive voltage proportional to the output power with power sense amplifier gain (e.g., 25 times power gain of the MAX4210E). The R19 (140KΩ) and R20 (10KΩ) resistor divide senses and samples output voltage. The sampling voltage Vs=Vo*R20/(R20+R19) scaled down Vo from 14V~58V to 0.667V~3.867V. The sampling voltage inputs to pin 2 "IN" of U1 (e.g., MAX4210E). The output current sensing signal in the form of voltage on R30 and R31 goes through R16 and filtered by C8 to pin 3 "+" input of U2A. This output current sensing voltage is then converted into a current by the Op Amp U2A (e.g., LM324).

A current mirror which comprises MOSFET Q1, resistor R18 (150Ω) and resistor R17 (150Ω) then converts it to a smaller voltage inputs to a differential input Pin 5 ("RS+") and Pin 7 ("RS−") of U1. For 5 W and 58V output LED driver, this LED output current from J2 Pin 2 ("LED−") flowing through R30 (0.6 ohms) and R31 (0.6 ohms) is converted to voltage which is V_RS=(Po*(R30//R31))/Vo. Po is the output power provided to output LED load. Vo is the output voltage which is on J2, Pin 1 ("LED−"). In this example, this current converted voltage V_RS is 0.026V. In another example, for 5 W and 14V output LED driver this current converted voltage V_RS is 0.15V. In this case, the maximum input voltage of "RS+" and "RS−" is 0.15V. These R18 and R17 values are chosen for this maximum input voltage. The sampling power full scale is 2.5V Ps=Gp*Vs*V_RS=25*0.667*0.15=2.5(V).

J1 is connected to the battery, which supplies the power to the invention. The auxiliary power supply Vcc (Pin 4 of U1) is 5V and is derived from J1 regulated by DZ1. The Op Amp output has enough headroom for power output with 5 volts Vcc. R21 (100K Ω) and R22 (10K Ω) is a voltage divider to scale down power sampling output, and thus provide power feedback, for next stage of power compensation circuit of Circuit 2. The resistor divider of R21 and R22 sets the pre-determined output power.

As shown in this embodiment, Circuit 2 is a PWM circuit configured to do power regulation. The basic PWM circuit is well known to those skilled in the art of Switching Mode Power Supply (SNIPS). In the normal application of PWM circuits, the voltage or current are being regulated. There is no literature or product in the market that uses the PWM circuit to do power regulation. The novel invention here teaches the use a regular PWM circuit to handle power regulation to the output loads.

Circuit 2 of FIG. 2. shows an embodiment of the invention as a two-switcher Forward power regulator comprising components: R23 (e.g., 24.9KΩ), R25 (e.g., 20KΩ), R30 (e.g., 0.6Ω), R31 (e.g., 0.6Ω), D1, D2, D5 (e.g., CMHD4448), D6 (e.g., CMHD4448), U4 (e.g., LM5015), C5 (e.g., 0.1 uF), C6 (e.g., 2200 pF), C2 (e.g., 150 pF), C9 (e.g., 0.01 uF), C11 (e.g., 0.1 uF), C12 (e.g., 330 uF), C15

(e.g., 0.22 uF), T1, L1 (e.g., 0.77 mH) and J2. It should be apparent that the role of Circuit 2 in FIG. 2 is to drive output LED strings by providing regulated power. The R23 (24.9KΩ), C6 (2.2 nF) and C2 (150 pF) form an error amplifier compensation circuit. The power sampling signal input from R21 and R22 goes into Pin 3 "FB". At the same time, the output of Pin 4 "COMP" after passing through the RC Network (e.g. C2, C6 and R23) also goes into pin 3 "FB" of the two switcher Forward regulator U4 (e.g., LM5015). These provide circuit stabilization.

In other words, the circuit network is stabilized and compensated by the external RC network and a built-in error amplifier inside U4 for converter operation. In this example, the output signal of error amplifier inside the PWM is a power error signal. This power error signal is called the outer loop feedback signal of the power regulator. In this example, the PWMU4 has a primary current feedback circuit. This primary current feedback signal is called the inner loop signal. The power error signal (generated from output current and output voltage to regulate output power by means of adjusting primary current pulse width) and primary current feedback signal are the inputs to a built-in PWM comparator inside U4 to generate pulse width modulation (PWM) signal to control the two built in MOSFET switchers to turn on and off. The turn on and turn off duration is defined by the PWM pulse width to achieve a +/−3% (or better) of tighter and better, adaptive power regulation. R25 (20KΩ) resistor connects to pin 2 "RT" and it programs oscillation frequency to 300 kHz, for example. C9 (0.01 uF) capacitor, sets the soft start delay time for example. C15 (0.22 uF) ceramic capacitor, is a bypass capacitor of Vcc of U4 for example.

Two clamp diodes D5, D6 are used to clamp the internal MOSFETs voltage to the input battery voltage. Therefore, there is no need for a snub circuit for the switching components. The C5 (0.1 uF) is a high side bootstrap bias capacitor. T1 is a step up Forward power transformer. T1 delivers primary power to the secondary LED load. D1 is output rectifier and D2 is the free wheel diode. D1 and D2 are Schottky diodes or fast recovery diodes with low forward drop voltage. The high frequency filter capacitor C11, and the output filter capacitors C12 attenuate output voltage ripple and noise spike. The output inductor L1 is selected to ensure Forward converter operates under continuous conducted mode (CCM). R30 (0.6Ω) and R31 (0.6Ω) are output LED current sensing resistors. The voltage on R30 and R31 provides feedback to the multiplier shown as Circuit 1. J2, a connector connects the converter to external LED strings.

For a Forward converter, it is known to those skilled in the art that:

$$Po = Vo*Io \quad (1)$$

$$Vo = Vin*D/n \quad (2)$$

where D is duty cycle, n is turns ratio Np/Ns where Ns is the primary turns and Ns is the secondary turns of the transformer (T1). In order to achieve the maximum output voltage range, the maximum and the minimum duty cycle must be properly selected based on the turn ratio of the transformer. For example, for a maximum output voltage of 58V, when minimum input voltage is 8.4V, the turns ratio should be selected to be 1:14, then, the maximum duty cycle is 0.49. As another example, when the output voltage is 14V and input voltage is 12V and with the same turn ratio of 1:14, the minimum duty cycle is 0.056.

Also, for the Forward converter, it is also known to those skilled in the art that, $$Io = Iin*D*n \quad (3)$$

Replace (2) and (3) to (1)

$$Po = (Vin*D/n)*(Iin*D*n) = Vin*Iin*DA2 \quad (4)$$

From equation (4) above, the output power is determined by input voltage Vin, input current Iin and duty cycle D. Thus, by controlling duty cycle D by power feedback, output power Po can be regulated.

As an example, for Circuit 1 of two switcher Forward converter, the maximum output power of the converter will correspond to a 2.5V on Pout (Pin 8) of U1. This is the power sampling voltage. In other words, the scaling on Pin 8 of U1 is such that a 2.5V on Pin 8 will make the converter deliver the maximum output power which is 5 watts in this example.

The voltage at Pin 3 of U4 (FB) will scale down to 1.26V by using 100K ohms as R21 and using 102K ohms as R22. This 1.26V on Pin 3 of U4 is the power feedback signal inputs. This Pin 3 of U4 ("FB" pin) is connected to the inverting input of the PWM's internal error amplifier. The non-inverting input of the PWM's internal error amplifier is connected to a 1.26V reference voltage as an example. The PWM's internal high gain error amplifier generates an error signal proportional to the difference between the regulated output power on Pin 3 of U4 "FB" and the reference voltage. The output of the error amplifier is connected to the Pin 4 of U4 "COMP" pin where is a Type II network of loop compensation formed by C6, C2 and R23. This network creates a pole at the origin that rolls off the high DC gain of the amplifier, which is necessary to accurately regulate the output power. A zero provides phase boost near the open loop unity gain frequency, and a high frequency pole attenuates switching noise.

The internal PWM current comparator compares the primary current sense signal on the internal current sensor resistor to a referenced current level (determined by the power error signal) and the current error signal is used to change the pulse width.

If the output power is less than 5 watts (in this example 5 W is the set/specified power of the LED load), then the error signal on Pin 4 (COMP) of U4 is less than the internal reference voltage. In this case, the output of internal error amplifier goes more positive and increases the pulse width of the PWM and increasing the output power to achieve the power regulation, and vice versa.

Figure 3:
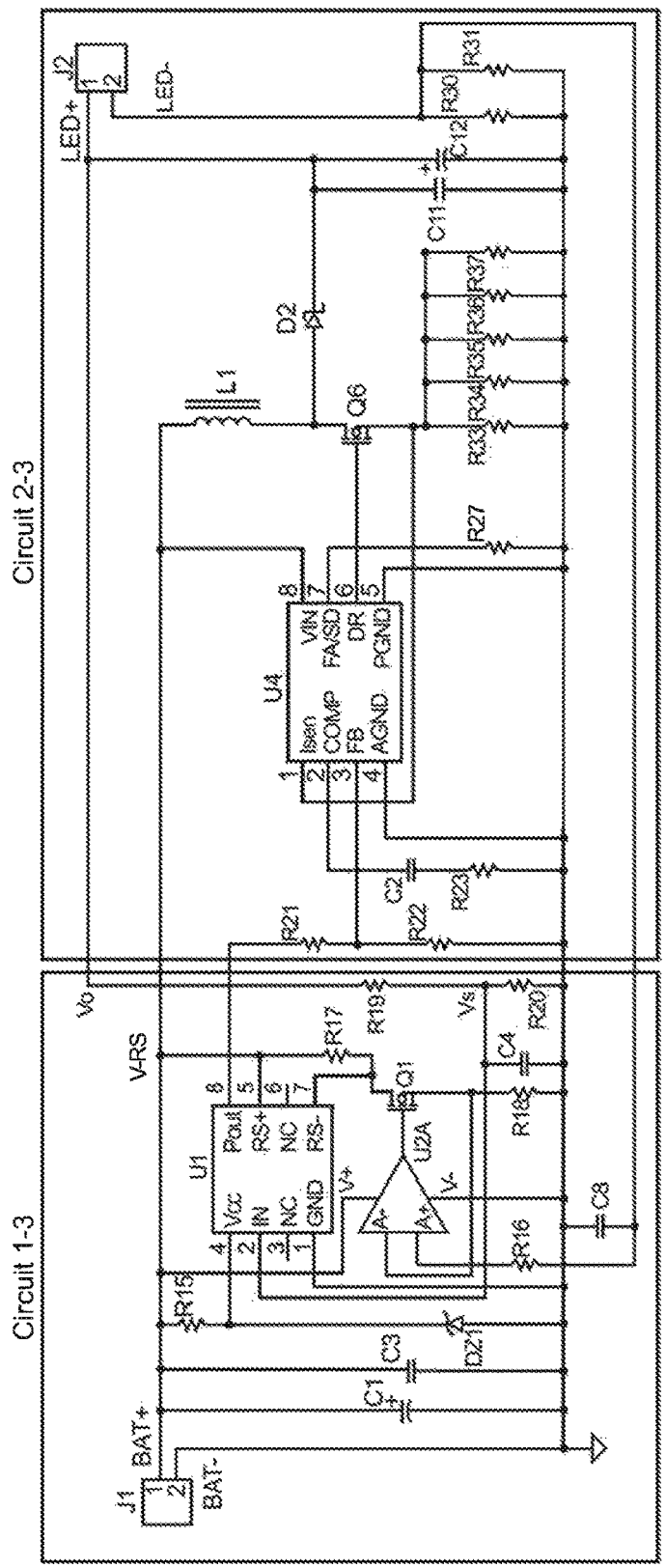
FIG. 3 illustrates a schematic for boost regulated power LED driver circuit, according to an embodiment.

FIG. 3 illustrates yet another embodiment of an alternate implementation of the invention. The schematic of FIG. 3 is a boost regulated power LED driver circuit, according to an embodiment. This exemplary embodiment may be configured as a 12 Watts boost regulated power LED driver with an output voltage range of 14V~58V.

It should be observed that Circuit 1 in FIG. 3 is the same as in FIG. 2, and, as such, its description when referring to FIG. 2 above is incorporated herein by reference.

Circuit 2 in FIG. 3 shows a boost converter PWM implementation of the power regulation. The following example is familiar to those skilled in the art of SNIPS, except that in this invention the boost circuit is used to do power regulation instead of voltage or current regulation. Circuit 2 of FIG. 3 comprises components: R21, R22, R23, R27, R30, R31, R33, R34, R35, R36, R37 D2, U4, C2, C11, C12, L1, Q6, and J2. It should be apparent that the role of Circuit 2 in FIG. 3 is similar to any PWM circuit, except that it is to drive output LED strings by providing regulated power. The R23 (40KΩ) and C2 (2.2 nF) form an error amplifier compensation circuit and is connected to PIN 2

(COMP) of U4. The power sampling signal input from R21 and R22 goes into PIN 3 (FB) of the PWM Chip U4 (e.g., LM3478).

Circuit 2 of FIG. 3 is stabilized and compensated by a RC network (R23 and C2) and built-in error amplifier of U4 for converter operation. The output signal of the compensation network is a power error signal.

A primary current feedback circuit is from the resistors network (R33 to R37) to PIN 1 (Isen) of U4. The power error signal together with the primary current signal generates the pulse width modulation inside U4. This PWM signal is used to achieve the tight regulation of +/−3% of the power output which is a far more superior power regulation than any similar product in the market.

R27 (40 k-ohm) is connected to PIN 7 of U4 and sets the switching frequency of 400 kHz for the boost converter.

Q6 is a power MOSFET connected to PIN 6 (DR) of U4 which is the driver port. PIN 6 of U4 controls the turning on and off of Q6. This turning on and off of Q6 enables the output power to be regulated.

L1 is a boost inductor. It is used to store and deliver power to the output LED loads. D2 is the output diode. D2 is used to deliver an output voltage that is higher than the input voltage. C11 and C12 are used to filter out high frequency noise and low frequency ripple.

R30 and R31 is the output current sensor resistor. They are used to provide feedback to the power multiplier in Circuit 1. J2 is the output connector It is well known to those skilled in the art that for a boost converter:

$$Ro=Vo/Io \quad (2)$$

Ro is the output impedance, Vo is the output voltage and Io is the output current.

$$Vo=Vin/(1-D) \quad (3),$$

Vo is the output voltage, Vin is the input battery voltage. where D is duty cycle. For maximum output voltage range, the maximum and minimum duty cycle and turns ratio must be calculated. For example, for maximum output voltage of 58V (Vo), when minimum input voltage is 8.4V (Vin), then the maximum duty cycle D is 0.855. When the output voltage is 14V, and input voltage is 12V the minimum duty cycle is 0.143. The duty cycle should be within a practical range for proper operation. It is between 1 and 0.

$$Io=Iin*(1-D) \quad (4)$$

Replace (3) and (4) to (1) the $$Rin=[Vo*(1-D)]/[Io/(1-D)]=(Vo/Io)*(1-D)^2 \quad (5)$$

Where Vo/Io=Ro in (5) and manipulate (5) become $$Rin=Ro*(1-D)^2 \quad (6)$$

(6) shows the load resistance Ro is reflected to input Rin by $(1-D)^2$.

Input power can express $$Pin=(Vin^2)/Rin \quad (7)$$

From (6), (7) uses duty cycle D can change Rin leads to change input power.

$$Po=Pin-Ploss \quad (8)$$

The above equations (1-8) proved that controlling the duty cycle (D) by the power feedback network, we can regulate the output power Po.

As an example, U4 (e.g., LM3478) device is a fixed frequency, Pulse Width Modulated (PWM) current mode controller integrated circuit chip. The inductor's peak current through the external MOSFET is sensed through an external sense resistor R33-R37 (0.053Ω). The voltage across current resistor is fed into the ISEN pin. This voltage is fed into the positive input of the PWM comparator. The output power sampling is through an external feedback resistor divider R21 and R22. This signal is fed into the error amplifier negative input which is the feedback pin, Pin 3 of U4 (FB).

U4 (a PWM IC chip) is used to perform the function of power regulation and voltage boosting based on the inputs it receives from Circuit 1 and inputs from the rest of the network shown in Circuit 2. Essentially, FIG. 3 shows how to use a prior art PWM boost circuit to work as a power regulated circuit.

Figure 4:
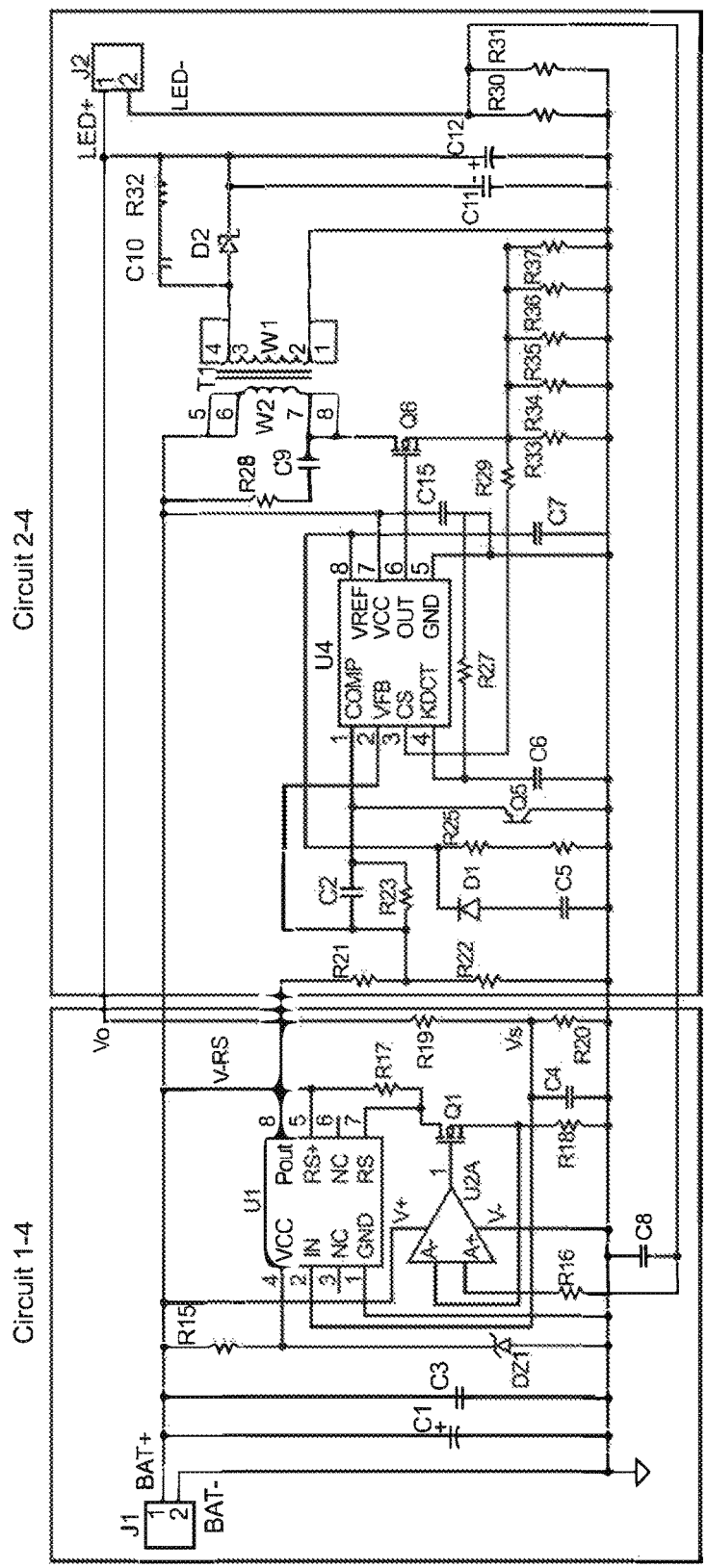
FIG. 4 illustrates a schematic for Flyback regulated power LED driver circuit, according to an embodiment.

FIG. 4 illustrates a schematic for Flyback regulated power LED driver circuit, according to an embodiment. This exemplary embodiment may be configured as a 15 Watts flyback regulated power LED driver with an output voltage range of 10V~58V.

It should be observed that Circuit 1 in FIG. 4 is the same as in FIG. 2, and, as such, its description when referring to FIG. 2 above is incorporated herein by reference.

It should be noted that Circuit 2 in all FIGS. 2, 3, 4 are fixed frequency PWM controller circuits for DC-DC converter. The PWM controller in all three circuits also provides full compensated Error Amplifier, current sense comparator and a totem pole output driver.

The PWM portion of Circuit 2 in FIG. 4 comprises components: R21, R22, R23, R24, R25, R26, R27, D1, U4, Q5, C2, C5, C6, C7 and C15. It should be apparent that the role of Circuit 2 in FIG. 4 is to drive output LED strings by providing regulated power. As an example, the R24 (1K Ω), C2 (0.1 uF), and R23 (100K Ω) form an error amplifier compensation circuit. As shown in FIG. 4, the input to Pin 2 ("IN") of U1 is the output voltage sampling which is Vs. Vs is derived from Vo. The power sampling signal output from Pin 8 ("Pout") of U1 passes through R21 to connect to the RC network (C2 and R23). Circuit 2 of FIG. 4 is stabilized compensated by the RC network and the built-in error amplifier of U4 (e.g., UC3845B) for the converter operation. The power compensation network consists of R24, R23 and C2.

The output signal of the power compensation network is a power error signal. This power error signal is connected to PIN 1 (COMP) of U4.

The primary current feedback signal is generated by the resistor networks (R33 to R37) and through R29 is connected to PIN 3 (CS) of U4.

The power error signal and primary current feedback are connected to PIN 3 (CS) of U4. Internal to the PWM chip, these signals on PIN 1 (COMP) and PIN 3 (CS) are the inputs of the built-in comparator used to generate pulse width modulation (PWM) signal on PIN 6 (OUT) of U4. The internal workings of the PWM IC chip is a well-known prior art and is therefore not fully elaborated here. The output of the PWM IC chip (PIN 6) which is a modulated pulse width signal turns on and turns off the power MOSFET (Q6) to achieve a tight power regulation of +/−3% and provide a better adaptive power regulation.

As an example, C6 (1000 pF) and R27 (10K Ω) resistor connected to pin 4 and pin 8 of U4 are used to set the oscillation frequency of the flyback converter. The oscillation frequency is 1.72/(R2*C6).

C7 (0.01 uF) is a bypass capacitor for the reference voltage output which is PIN 8 (Vref) of U4.

C15 (1 uF), a ceramic capacitor is used as a bypass capacitor for Vcc which is PIN 7 of U4.

The soft start and primary inductance current sense voltage clamping circuit consists of D1, C5, R25, R26 and Q5.

As an example, C5 (1 uF) capacitor, R25 (100 k Ω), R26 (34K Ω) resistors and a PNP small signal transistor, Q5, form the soft-start circuit and the primary inductance current sense voltage clamping circuit.

The clamping circuit includes resistors R25 and R26. The clamping voltage is (R25/(R26+R25))*1V. In this embodiment, the clamping circuit clamps peak voltage in current of sensor resistor from 1 V to 0.25 V by selecting R25 and R26 value. It greatly reduces power loss on current sensing resistor.

Circuit 2 of schematic diagram shown in FIG. 4 is a Flyback adaptive converter to implement the regulated constant power LED driver.

The Flyback converter comprises components: R28, R29, R33, R34, R35, R36, R37, R32, R30, R31, D2, T1, Q6, C9, C10, C11, C12 and J2. As an example, the R28 (4.3Ω) and C9 (2200 pF) provide snubbing on the primary winding of T1 to attenuate the voltage spike generated by transformer's leakage inductance on primary winding of T1. Q6 is power switching NMOSFET controlled by output PIN 6 (OUT) of U4. The R33, R34, R35, R36 and R37 resistor network is the primary inductance current sensing resistors. All the resistors (R33 to R37) selected in this example is 0.24Ω to achieve a 15 W constant power output. It should be understood that different resistors' value is needed for different output power.

T1 is a Flyback power transformer. T1 delivers primary power to secondary LED load. The primary and secondary windings in the Flyback transformer (T1) conduct current at different times. The Flyback transformer actually operates as an inductor when the primary winding is conducting. The primary to secondary ampere-turns ratio is conserved in this conducting mode. The voltage transformation is taking place between primary and secondary windings of T1, whereby the secondary voltage is reflected to the primary winding during transistor Q6 turn off time.

The power feedback, primary current feedback and power compensation network changes the pulse width to regulate the output power deliverable from primary winding's stored power. The C10 (100 pF) and R32 (475Ω) is the snubber on output diode D2 to attenuate voltage spike generated by transformer leakage inductance on secondary winding of transformer T1.

The output diode D2 is to rectify the output voltage of transformer T1 output. C11 (0.1 uF) and C12 (680 uF) are used to filter high frequency voltage spikes and to filter low frequencies ripples.

R30 (0.2Ω) and R31 (0.2Ω) are output LED current sensing resistors. The voltage on R30 and R31 provides feedback to the multiplier circuit in Circuit 1 of FIG. 4. The C11 (0.1 uF) and C12 (680 uF) are output filter capacitor to smooth the output DC voltage and current. J2 is connector to connect the converter to external LED strings.

Figure 5:
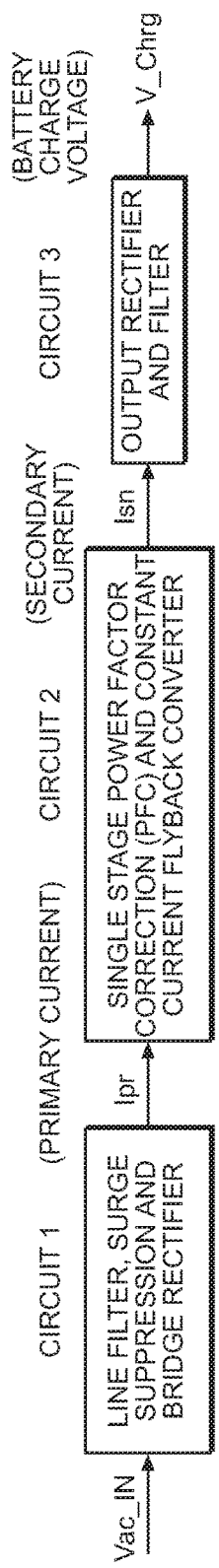
FIG. 5 illustrates a block diagram for circuits which convert AC to DC.

FIG. 5 illustrates a block diagram for circuits which convert AC to DC. When AC power presents, a battery is charged with a DC trickle charger current rate C/20~C/24, as is known to those of ordinary skill in the art. It should be noted that the ensuing description refers only to the circuits and circuit components shown in FIG. 5, unless stated otherwise. The AC to DC converter may include three circuits to perform conducted and radiated emissions attenuation, surge suppression, rectify input AC voltage, single stage power factor correction (PFC), and constant current battery charging. The battery charge circuit disclosed herein may provide constant current to a battery for back up powered emergency lighting system. It should be noted that the structure and function of the elements depicted in FIG. 5 will be readily apparent from the ensuing description referring to FIG. 7.

Figure 6:
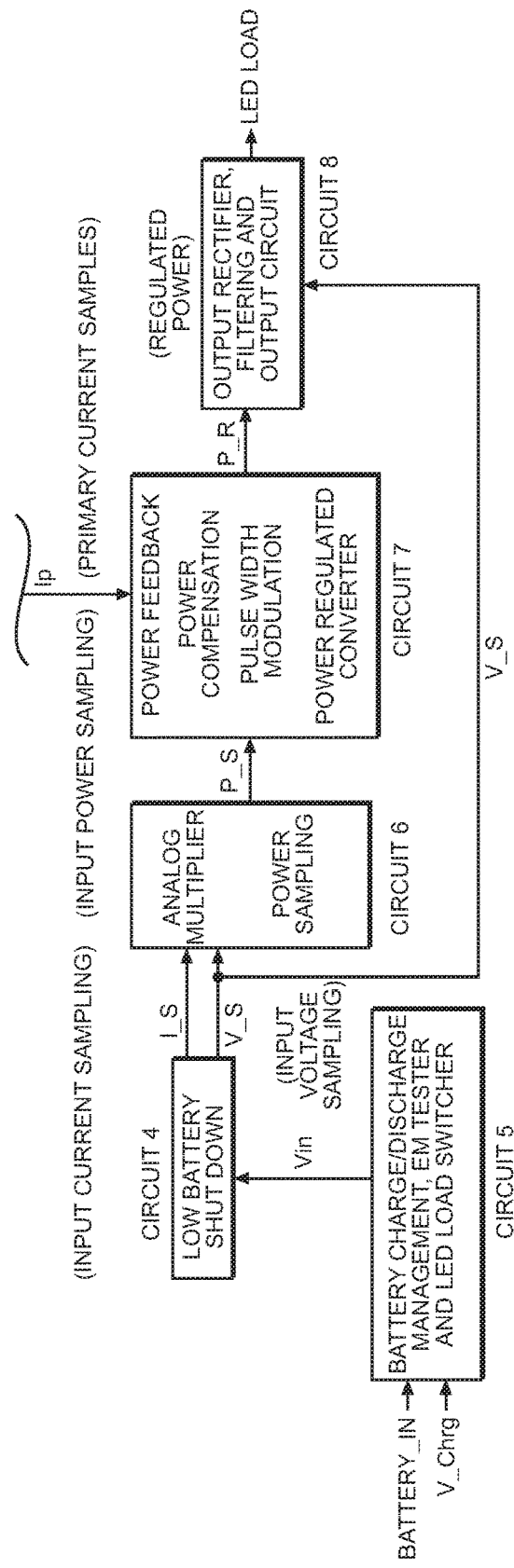
FIG. 6 illustrates a block diagram for circuits which may be designed to seamlessly switch from normal to emergency ("EM") lighting mode.

FIG. 6 illustrates a block diagram for circuits which may be designed to seamlessly switch from normal to emergency ("EM") lighting mode. More particularly, the circuits shown in the block diagram may perform power regulation LED driver circuit, low battery shutdown, battery charge/discharge management, and switch-over and output seamless load switching using Oring diodes. This eliminates the use of relays which saves cost and avoids high voltage transients on the LED loads. It should be noted that the ensuing description refers only to the circuits and circuit components shown in FIG. 6, unless stated otherwise.

As will be disclosed in greater detail hereinafter, the power regulated LED driver circuit depicted by FIG. 6 provides constant power to LED strings using a power feedback and power compensation network for an emergency lighting system powered by a backup battery. The adaptive power converters disclosed herein use power feedback to adjust the power delivered to the LED strings and provides a predetermined constant power and a constant lumen during all lighting backup periods. Additionally, the adaptive power converters disclosed herein will meet the regulatory requirements that a backup lighting system run for at least 90 minutes while maintaining the minimum lumens in the event of an emergency. It should be noted that the adaptive power converters can be used in conjunction with a wide variety of LEDs types and LED strings. The adaptive power converters disclosed herein may be mass produced at a lower cost compared to adaptive power converters currently on the market, as it does not require manual tuning of each part during mass production. It should be noted that the structure and function of the elements depicted in FIG. 6 will be readily apparent from the ensuing description referring to FIGS. 8-11.

Figure 7:
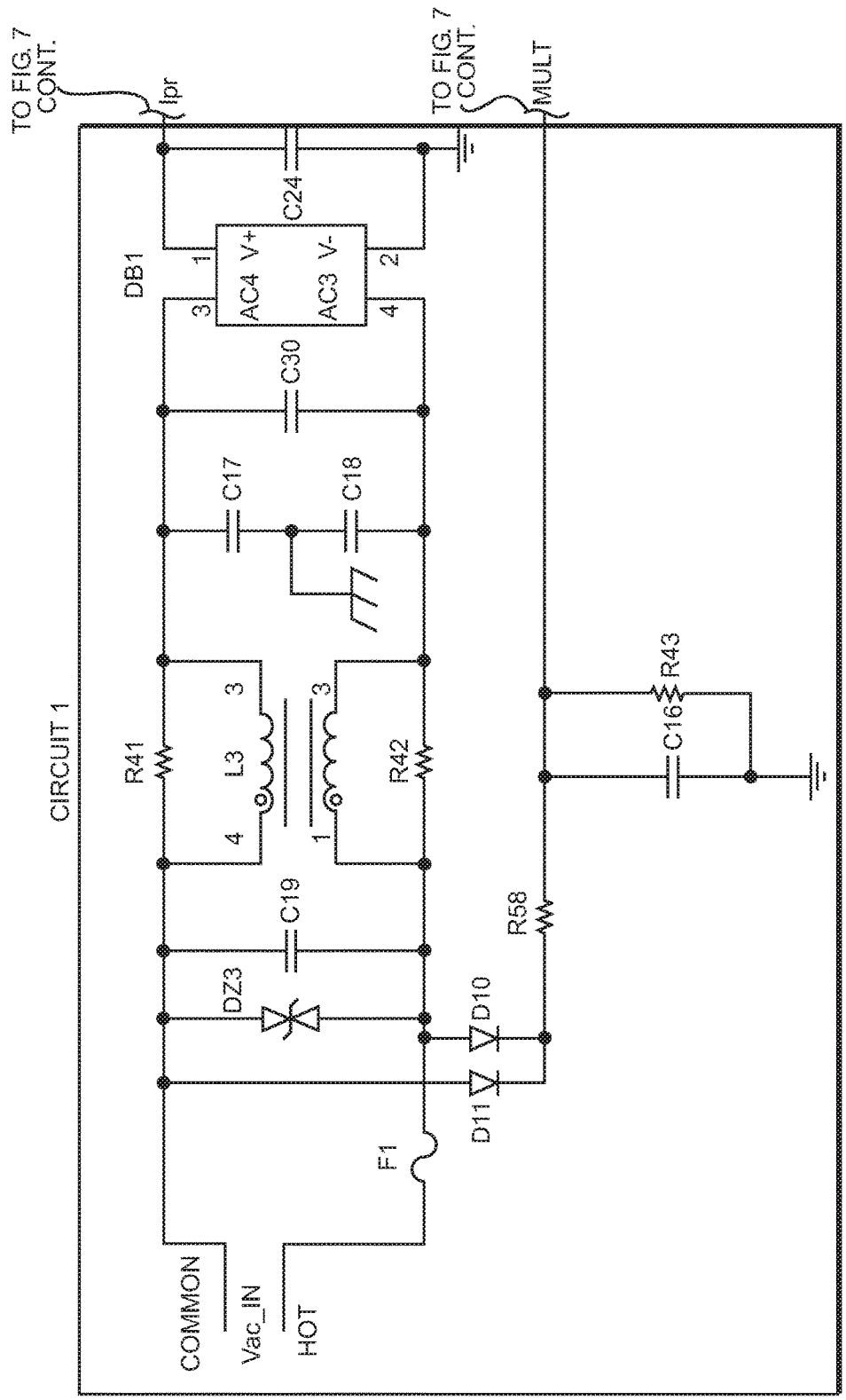
FIG. 7 illustrates a schematic diagram of an AC to DC converter, according to an aspect.
Figure 7:
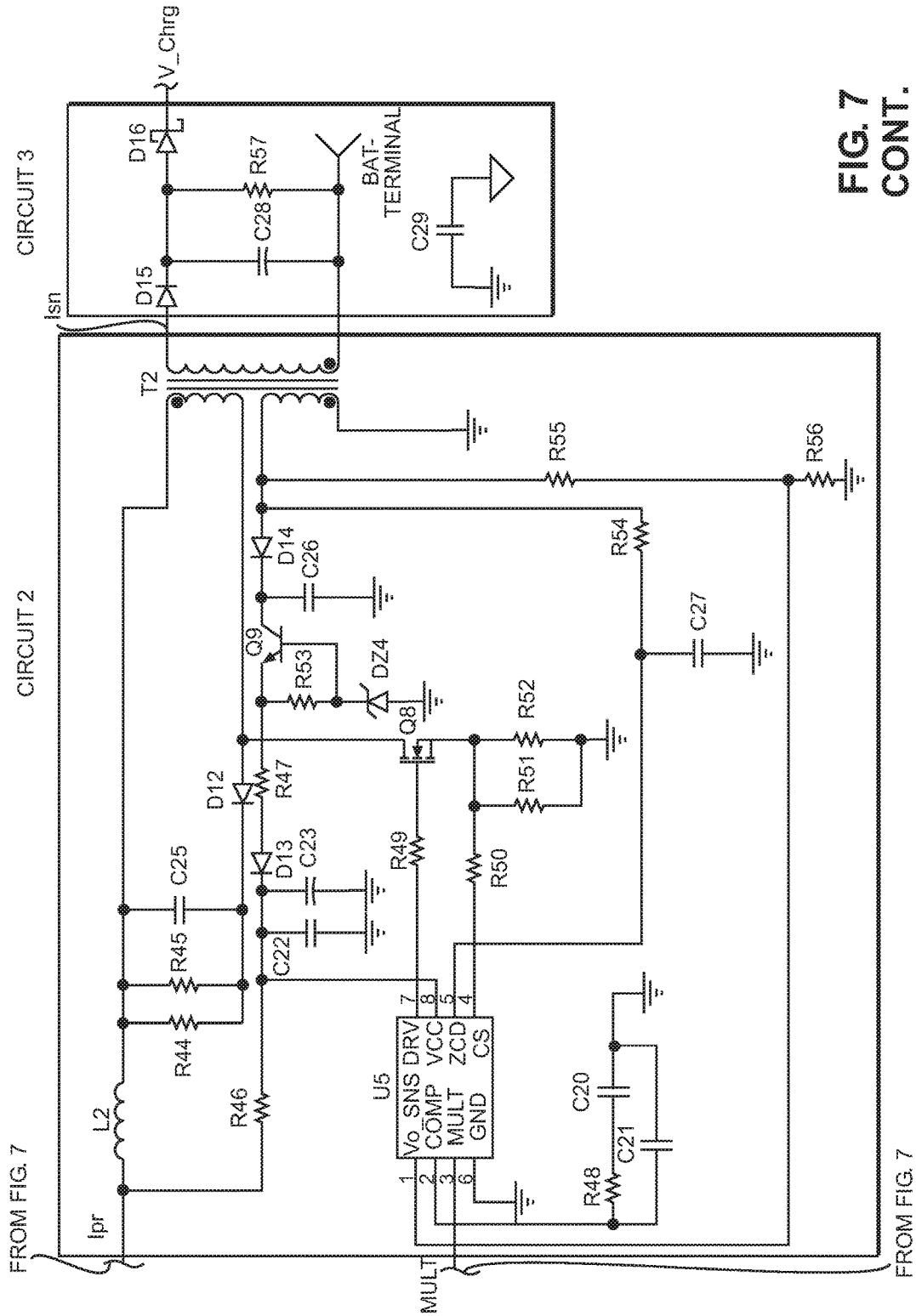

FIG. 7 illustrates a schematic diagram of an AC to DC converter, according to an aspect. It should be noted that the ensuing description refers only to the circuits and circuit components shown in FIG. 7, unless stated otherwise. This exemplary AC to DC converter may be configured to operate up to 17 volts step down from 108V~305V AC input. This circuit may energize a 5V relay coil and charge a battery within 4.2%~5% of full charge at a rate of C/24~C/20, i.e., within full charge in 20-24 hours.

Circuit 1 of FIG. 7 may comprise of the following components: F1 (e.g., SS-5H-1.25A-APH), DZ3 (e.g., 07D511K), C19 (e.g., 0.022 uF), L3 (25mHx2), R41 (e.g., 4.75KΩ), R42 (e.g., 4.75KΩ), C17 (e.g., 4.7 nF), C18 (e.g., 4.7 nF), C30 (e.g., 0.022 uF), DB1 (e.g., LMB8S-TP), C24 (e.g., 0.022 uF), R58 (e.g., 2MΩ), R43 (e.g., 11 kΩ), C16 (e.g., 1 nF), D10 (e.g., RS1M) and D11 (e.g., RS1M). As shown, L3 of Circuit 1 may be a common mode inductor and the two X-type capacitors, C19 and C30, and the two Y-type capacitors, C17 and C18 may form a line filter to attenuate higher frequency switching noise, thus performing conducted and radiated emissions attenuation, as is known to those of ordinary skill in the art. Resistors R41 and R42 are in parallel with windings of common mode inductor L3 to dump the inductor's self-resonance ringing. A fuse F1 isolates circuit from input power supply to prevent fire or explosion in the event serious circuit failure happens. DZ3, which is an MOV component, is used to attenuate power line surge and lightning travelling through the input to Circuit 1. A bridge rectifier DB1, rectifies AC input voltage. The input voltage sine waveform is rectified by D11 and D10 and scaled down by R58 and R43, then sampled and provides for PFC circuit in Circuit 2. C16 filters noise spike on input voltage sample.

Circuit 2 of FIG. 7 may comprise the following: a post filter of differential inductor L2 (4.7 mH), PFC controller U5 (UCC2805), MOSFET Q8, NPN transistor Q9, resistors R45 (49.9 kΩ), R44 (49.9 kΩ), R46 (1MΩ), R47 (20Ω), R53 (2 kΩ), R49 (10Ω), R50 (332Ω), R51 (10Ω), R52 (4.32Ω), R48 (11.5 kΩ), R54 (22.1 kΩ), R55 (100 kΩ), R56 (19.1 kΩ), capacitors C25 (4.7 nF), C22 (0.1 uF), C23 (10 uF), C26 (0.1 uF), C20 (1 nF), C21 (0.12 uF), C27 (18 pF), diodes D12 (RS1M), D14 (S13), D13 (RS1M), zener diode DZ4 (16V) and a flyback transformer T2. As shown in this schematic diagram, Circuit 2 is a single stage PFC and constant current flyback converter which can energize a 5V relay coil and charge a backup battery (not shown in Circuit 2) within 4.5%~5% of full charge at a rate of C/22~C/20, i.e., within full charge in 20-24 hours. The basic flyback single stage PFC and PWM converter circuit is known to those of ordinary skill in the art of Switching Mode Power Supply (SMPS).

Circuit 3 of FIG. 7 may comprise the following: a diodes D15 (SMD1200PL-TP), D16 (SMD1200PL-TP), capacitors C28 (470 uF), C29 (4.7 nF) and a dummy resistor R57 (20K). Circuit 3 is a flyback output rectifier and filter circuit. Capacitor C28 filters the voltage ripple and provides smooth voltage to the battery and diode D15 rectifies the voltage from T2. D16 connects on output V_Chrg to prevent battery flow back. Capacitor C29 is a bridge capacitor, which provides a higher frequency path for switching waveform signal.

Figure 8:
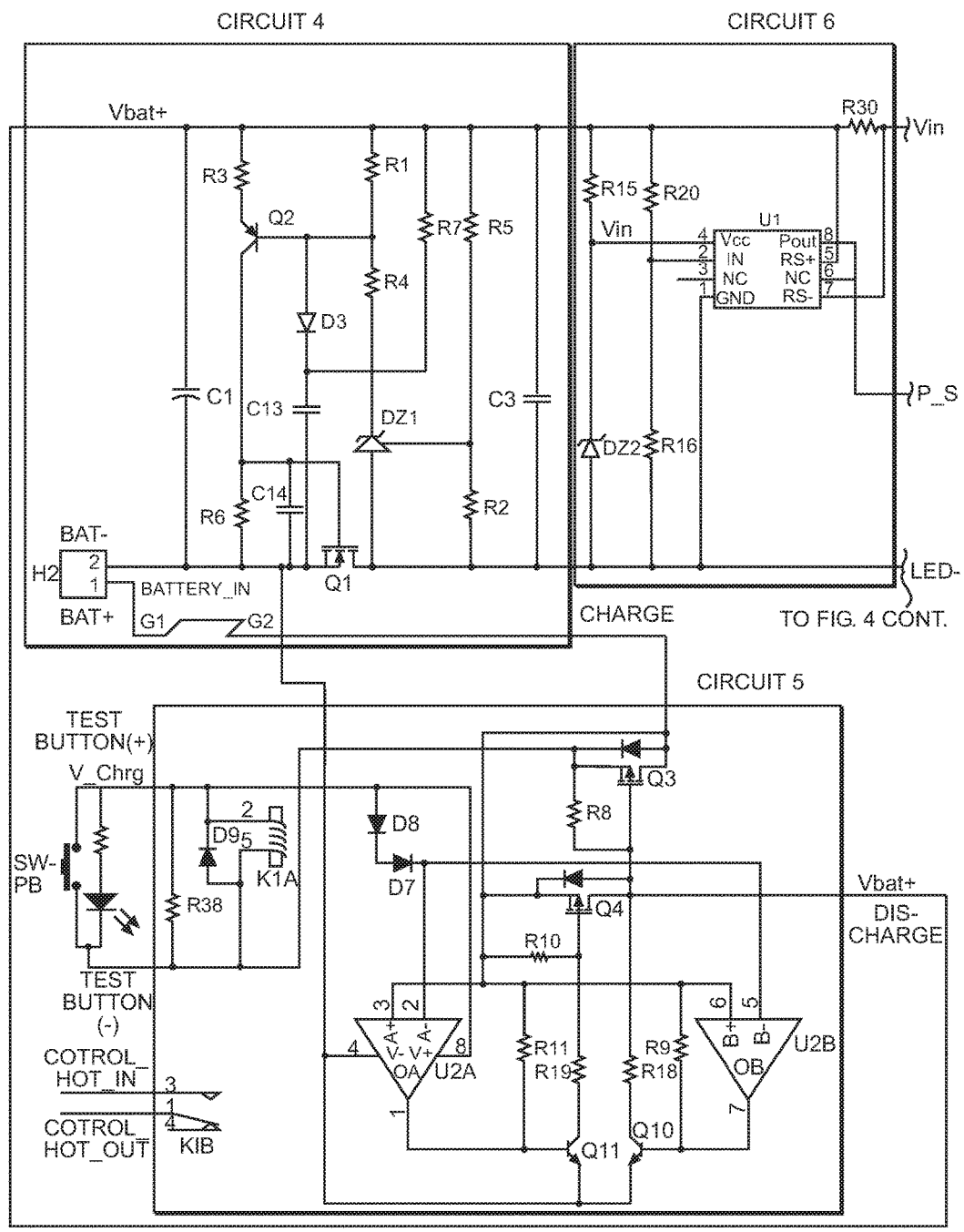
FIG. 8 illustrates a schematic diagram of two switcher Forward regulated power LED driver circuits, a low battery shutdown circuit, and a battery management circuit, according to an aspect.
Figure 8:
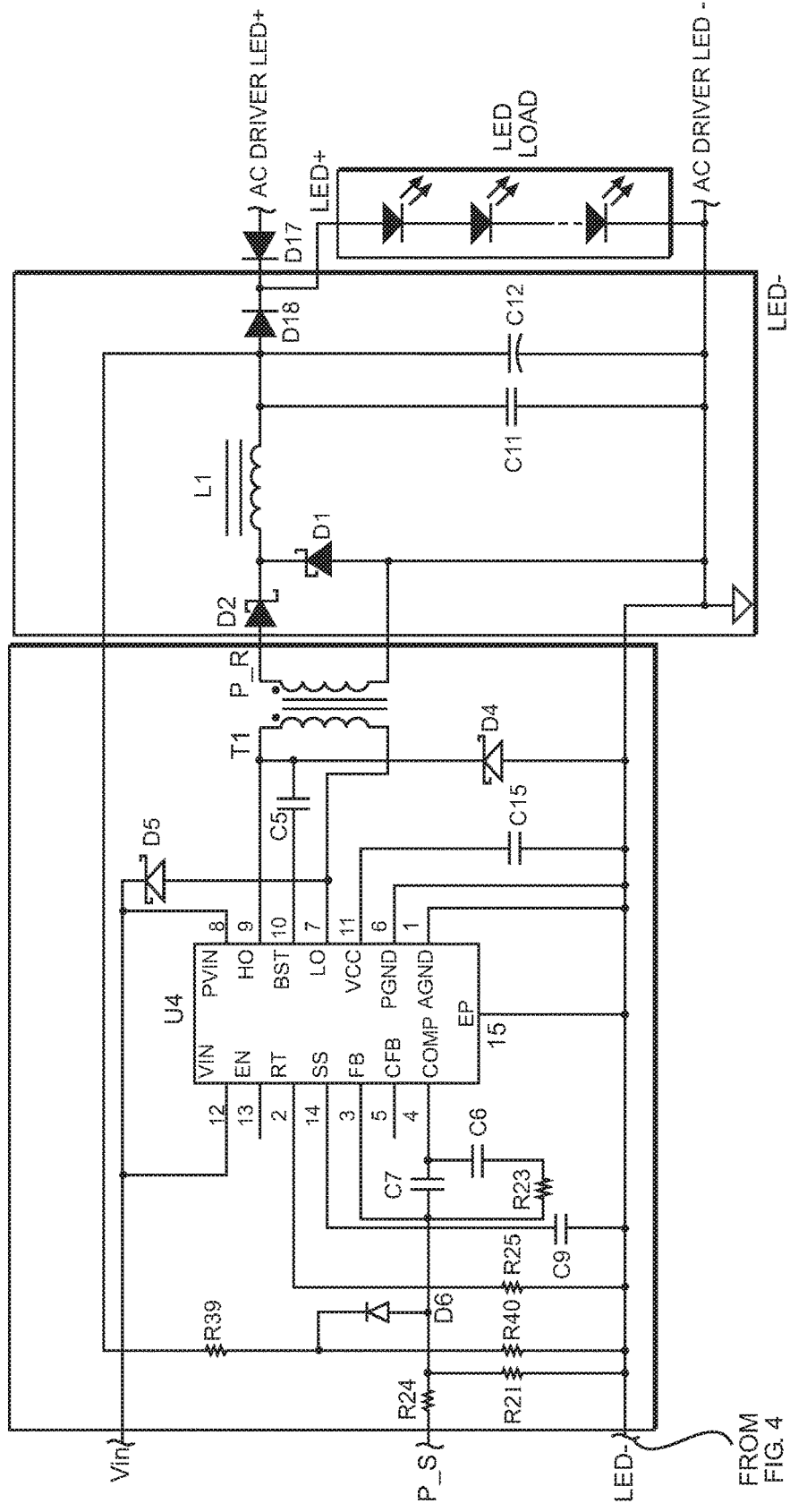

FIG. 8 illustrates a schematic diagram of two switcher Forward regulated power LED driver circuits, a low battery shutdown circuit, and a battery management circuit, according to an aspect. It should be noted that the ensuing description refers only to the circuits and circuit components shown in FIG. 8, unless stated otherwise. This exemplary schematic diagram may be configured as a 5 Watts two switchers forward LED driver powered by a backup battery with an output voltage range of 14V~58V when AC power is out.

Circuit 4 ("low battery shut down circuit") of FIG. 8 may comprise the following components: resistors R3, R1, R4, R7, R5, R2, R6, capacitors C1, C13, C14, C3, BJT Q2, MOSFET Q1, shunt diodes DZ1, diode D3, wire connectors G1 G2, and connector H2. Circuit 4 is low battery voltage shut down (LBVSD) protection circuit to prevent the backup battery over drain current when the voltage reaches a low level. At the location where voltage Vbat+ is provided to the circuit, the C1 stores and provides a large pulse current when needed by the circuit. Next, the current first goes through R3 (1 kΩ) to the emitter of Q2 and through R1 to the base of Q2 (MMBT3906-7-F), then the current goes through D3 (B160-13-F) and C13 (0.22 uF), which turns on Q2. When Q2 is on, it provides a path to charge C14 (1 uF) and build up voltage on R6 (24.9 kΩ), which turns on Q1 (FDD86102LZ).

When the MOSFET Q1 is on, current will flow though the source and drain terminals, thus the backup battery is connected to the rest of Circuit 4 via the connector H2. The sensed battery voltage sample on resistor divider of R5 (57.6 kΩ) and R2 (10 kΩ) inputs to reference port of a shunt diode DZ1 (TLV431AQFTA). If battery voltage is higher than 8.4V, for example, then current goes through DZ1, R1 (4.99 Ωk), and R4 (4.99 Ωk), thus another path through R4 to the base of Q2 is provided to keep Q2 on. When the battery voltage is lower than 8.4V, for example, DZ1 becomes high impedance and turns off Q2, which then turns off Q1. If the battery voltage bounces back higher than 8.4V, then charged capacitors C13 and C14 will keep Q1 and Q2 off. Thus, Q1 and Q2 will only turn back on once the battery has completely disconnected from the circuit to discharge C13 and C14 and is then reconnected with a voltage higher than 8.4V. This lockout circuit prevents oscillation under low battery voltage and reduces further draining of the battery. C1 (820 uF) stores energy and C3 (2.2 uF) reduces input voltage ripple of Circuit 5, respectively. Connector H2 connects the backup battery to the system. Wire connectors G1 and disconnect the backup battery from the system when the product is in transportation or in storage to prevent the battery from draining.

Circuit 5 ("battery management circuit") of FIG. 8 may comprise the following components: resistors R38, R8, R10, R9, R11, R18, R19, diodes D9, D8, D7, relay coil K1A, relay contactor K1B, MOSFETs Q3 and Q4, NPN transistors Q11 and Q10. comparator U2 (LM393DT), and test button SW-PB. It should be noted comparator U2 is represented in Circuit 5 as U2A and U2B. Circuit 5 is a battery management circuit which determines whether the system is under charge mode to charge battery or whether the system is under discharge mode to power the LED driver via backup battery. Circuit 5 also controls a relay coil K1A which switches the LED load to connect to the EM driver when the test button is pressed. The test button is an external circuit which is needed to explain the test function of the battery management circuit. It should be noted that V_Chrg comes from Circuit 3 of FIG. 7.

Under charge mode, the battery voltage can be assumed to be 9.6V and the relay coil K1A (5V DC relay) voltage may be 5V, thus the voltage V_Chrg is 14.6V. V_Chrg from the battery charge circuit, Circuit 3, goes through D8 (B160-13-F) and D7 (B160-13-F) to the comparator U2 (LM393DT). More particularly, V_Chrg goes to the inverting pin 2 of U2A and the inverting pin 5 of U2B. The voltage on pin 2 of U2A and pin 5 of U2B may be 13.2V, which is equal to V_Chrg minus the two forward voltage drops on D7 and D8. The 9.6V battery voltage BAT+ goes into the non-inverting pin 3 of U2A and non-inverting pin 6 of U2B. If the voltage on pin 5 is greater than voltage on pin 6, then the output on pin 7 of U2B is floating. Thus, Vbe of _Q10 is forward biased and Q10 (FMMT619TA) is on. R9 (4.99 kΩ) limits the base current of Q10. When Q10 is on, Vgs of Q3 is greater than the threshold voltage and Q3 (NTD25P03LT4G) is on. In this scenario, the built-in body diode of Q3 is forward and on. R8 (100 kΩ) and R18 (100Ω) form a resistor divider connected to the gate of Q3 and provide gate bias of Q3. The V_Chrg goes through coil K1A, then through Q3, then through the wire connectors G2 and G1 to BAT+ to charge the backup battery. In Circuit 5, when the relay coil K1A is energized, relay contact 1 and contact 3 of K1B are engaged. This controls the AC power going through CONTROL_HOT_IN to CONTROL_HOT_OUT and enters external AC driver. When the LED indicator inside of "Push Button" SW-PB is lit, it shows that battery is under charge. If the voltage on pin 3 is less than voltage on pin 2, then output pin 1 of U2A is 0V. Thus, Vbe of Q11 (FMMT619TA) is also 0V and Q11 is off. Then, Vgs_Q4, which is in parallel with R10 (100 kΩ), is 0V and Q4 (NTD25P03LT4G) is off. When Q4 is off, the path of the battery voltage BAT+ to the driver input Vbat+ is cut by Q4. In this scenario, the built-in body diode of Q4 is reversed and off.

Under discharge mode, there is no power from the charge circuit and the coil K1A is not energized. Thus, there is no voltage across the LED indicator inside of "Push Button"

SW-PB, which turns the LED indicator off and shows that the system is in EM mode. In Circuit 8, relay contact 1 and contact 4 of K1B is at normal_on status and disconnects AC power to normal AC Driver through CONTROL_HOT path. This prevents the Emergency LED Driver and the normal AC Driver from both powering the LED load at the same time when under test mode. The voltage V_Chrg is equal to the voltage from the battery (9.6V) minus the voltage (0.7V) drop across the diode D9 (B160-13-F) and the body diode of Q3 (1V), i.e., V_Chrg=9.6V-1.7V=7.9V. Then, the voltage V_Chrg 7.9V goes across diodes D7 and D8, which drop V_Chrg by 1.4V, such that a voltage of 6.5V is applied to pin 5 of U2B and to pin 2 of U2A. As disclosed hereinbefore, the voltage on pin 6 of U2B and pin 3 of U2A comes directly from the battery BAT+, 9.6V. If the voltage on pin 6 is greater than voltage on pin 5 then the output on pin 7 of U2B is 0V. Thus, Vbe of Q10 is 0V and Q10 is off. Then Vgs of Q3 is in parallel with R8 is 0V and Q3 is off. It should be noted that the voltage flowing from BAT+ through body diode of Q3 to V_Chrg is blocked from going back through Circuit 3 of FIG. 7 by the diode D16 of Circuit 3 of FIG. 7. Thus, no current flows back into Circuit 3 of FIG. 7 during discharge mode. If the voltage on pin 2 is less than voltage on pin 3 then the output on pin 1 of U2A is floating. Thus, Vbe of Q11 is forward biased and Q11 is on. Then Vgs of Q4 is greater than the threshold voltage and Q4 is on. The resistor divider formed by R10 (100 kΩ) and R11 (100Ω) are connected to the gate of Q4 provide gate bias of Q4. In this scenario, battery voltage BAT+ goes through Q4 and voltage Vbat+ powers the EM driver circuit in Circuit 7.

Under test mode, if the system is under charge mode, while the push button SW-PS is pressed the coil of K1A is de-energized, and relay contact 1 and contact 4 at normal_on status of K1B and AC power through CONTROL_HOT-_from Vac IN HOT to normal AC Driver is disconnected. The normal LED AC Driver is de-active, and the battery charge converter's output reduces from 14.6V to 9.6V, which is equal to battery voltage BAT+. Then, similar to discharge mode, Q3 is off and Q4 is on. Then, the system changes to EM mode and backup battery powers the LED driver. This mode checks whether or not the function of battery, relay contact, battery charge/discharge management circuit and EM LED driver are working. The resistor R38 (249Ω) is in parallel with K1A to adjust relay coil current.

Circuit 6 ("power sampling circuit") of FIG. 8 may be an analog multiplier circuit for power sensing and power sampling. This analog multiplier circuit may be implemented by using an analog multiplier device U1, including, but not limited to MAX4210F, or other similar devices that may be constructed by using discreet components and/or integrated circuits (IC). In this example, the analog multiplier device MAX4210F multiplies the samples of samples of input voltage and input current to generate an analog voltage, called the input power sampling signal, proportional to the output power consumed by the LED load. (correct?)

Circuit 6 of FIG. 8 may be an input power sampling signal generator circuit and comprise the following components: R15 (e.g., 75KΩ), R16 (e.g., 6.04KΩ), R20 (e.g., 100KΩ), R24 (e.g., 1KΩ), R30 (e.g., 0.047Ω), DZ2 (e.g., 5V) and U1 (e.g., MAX4210F). R15 and DZ2 provide 5V linear regulated auxiliary voltage (Vcc) for U1 (e.g., MAX4210F). U1 operates in the positive quadrant to provide a positive voltage proportional to the output power with a power sense amplifier gain (e.g., 40.96 times power gain of the MAX4210F). The R20 (100KΩ) and R16 (8.87KΩ) resistor divide senses and samples input voltage Vs. Voltage Vbat+ is scaled down from 8.4V~12V by R16 and R20 to Vs 0.626V~0.894V, i.e., the sample voltage Vs=(Vbat+)*R16/(R20+R16). The input voltage range of 8.4V~12V is smaller than the output voltage range, thus sampling input voltage may be more accurate. The sample voltage Vs inputs into pin 2 "IN" of U1 (e.g., MAX4210F). The input current sensing signal in the form of voltage, called V_RS, is taken as a differential signal on R30 and is input into the differential inputs of pin 5 "RS+" and pin 7 "RS−" of U1 (e.g., MAX4210F). If the assumed circuit efficiency is 85%, then for 15 W output LED driver the voltage across differential inputs "RS+" and "RS−" (V_RS) is at minimum 0.0691V and at maximum 0.0987V. For example. It should be noted that R30 may preferably be a very small resistor, such that there is less power loss.

As an example, sampling power P_S=Gp*Vs*V_RS=40.96*0.894*0.0691=2.5(V), where Gp is the current-sense amplifier gain (V/V), Vs is sample voltage, and voltage across R30, appear at "RS+ and RS− (V_RS) is the current sample in the form of voltage. The sampling power full scale is 2.5V. Input power equals output power plus circuit power loss. The difference of power loss in same product is very small, therefore, we can use input power sample to regulate output power. The power sampling output P_S provides power feedback for next stage of power compensation circuit of Circuit 7.

Circuit 7 ("power regulation circuit") of FIG. 8 may be a PWM circuit configured to do power regulation. The basic PWM circuit is well known to those skilled in the art of Switching Mode Power Supply (SMPS). In the normal application of PWM circuits, only the voltage or current is being regulated. There is no literature or product in the market that uses the PWM circuit to do power regulation by regulating the product of voltage and current. Again, an aspect of the invention is the use of a regular PWM circuit to handle power regulation to the output loads.

As shown, Circuit 7 of FIG. 8 may be an embodiment of the invention as a two-switcher Forward power regulator and may comprise the following components: R21 (e.g., 10.2 kΩ), R23 (e.g., 100 kΩ), R24 (e.g., 10 kΩ), R25 (e.g., 20 kΩ), R39 (e.g., 453 kΩ), R40 (e.g., 15.4 kΩ), D5 (e.g., CMHD4448), D6 (e.g., 1N4148), D4 (CMHD4448), U4 (e.g., LM5015), C15 (e.g. 0.22 uF), C5 (e.g., 0.1 uF), C6 (e.g., 2200 pF), C7 (e.g., 150 pF), C9 (e.g., 0.01 uF), and T1 a step up Forward power transformer.

It should be apparent that the role of Circuit 7 of FIG. 8 is to drive output LED strings by providing regulated power. The R23 (100KΩ), C6 (2.2 nF) and C7 (150 pF) form an error amplifier compensation circuit. The power sampling signal is taken via R24 input into Pin 3 "FB" of U4. At the same time, the output of Pin 4 "COMP", after passing through the RC Network (e.g. C7, C6 and R23), also goes into pin 3 "FB" of the two switcher Forward regulator U4 (e.g., LM5015). These provide circuit compensation and stabilization.

In other words, the circuit network is stabilized and compensated by the external RC network and a built-in error amplifier inside U4 for converter operation. In this example, the output signal of error amplifier inside the PWM is a power error signal. This power error signal is called the outer loop feedback signal of the power regulator. In this example, the PWM U4 has a primary current feedback circuit. This primary current feedback signal is called the inner loop signal. The power error signal to regulate output power by means of adjusting primary current pulse width and primary current feedback signal are the inputs to a built-in PWM comparator inside U4 to generate pulse width modulation (PWM) signal to control the two built in MOSFET switchers to turn on and off. The turn on and turn off duration is defined by the PWM pulse width to achieve a +/−3% (or better) of tighter and better, adaptive power regulation. R25 (20 kΩ) resistor connects to pin 2 "RT", such that R25 programs an oscillation frequency of 300 kHz, for example. C9 (0.01 uF) capacitor, sets the soft start delay time for example. C15 (0.22 uF) ceramic capacitor, is a bypass capacitor of Vcc of U4 for example.

In FIG. 8 CONT, CIRCUIT 7, R39 (453KΩ) and R40 (15.4 KΩ) resistor divide and voltage offset diode D6 (1N4148) limits the maximum output voltage of LED load to be less than 60V. The reference voltage in internal Op-Amp of U4 is 1.26V and forward voltage on D6 is 0.7V then the voltage on R39 and R40, which is also output LED voltage, can be calculated: (1.26V+0.7V)*(R39+R40)/R40=1.96V*468.4 KΩ/15.4 KΩ=59.6V.

In the same circuit, two clamp diodes D5, D6 are used to clamp the internal MOSFET's voltage to as high as the input battery voltage when it goes high and to as low as 0V when it swings to negative. Therefore, there is no need for a snubber circuit for the switching components. The C5 (0.1 uF) is a high side bootstrap bias capacitor. T1 is a step-up Forward power transformer. T1 delivers primary power to the secondary LED load.

For a Forward converter, it is known to those skilled in the art that:

$$Po=Vo*Io \quad (1)$$

$$Vo=Vin*D/n \quad (2)$$

where D is duty cycle, n is turns ratio Np/Ns where Ns is the primary turns and Ns is the secondary turns of the transformer (T1). In order to achieve the maximum output voltage range, the maximum and the minimum duty cycle must be properly selected based on the turn ratio of the transformer. For example, for a maximum output voltage of 58V, when minimum input voltage is 8.4V, the turns ratio should be selected to be 1:14, then, the maximum duty cycle is 0.49. As another example, when the output voltage is 14V and input voltage is 12V and with the same turn ratio of 1:14, the minimum duty cycle is 0.056.

Also, for the Forward converter, it is also known to those skilled in the art that, $$Io=Iin*D*n \quad (3)$$

Replace (2) and (3) to (1)

$$Po=(Vin*D/n)*(Iin*D*n)=Vin*Iin*D^2 \quad (4)$$

From equation (4) above, the output power is determined by input voltage Vin, input current Iin and duty cycle D. Thus, by controlling duty cycle D by power feedback, output power Po can be regulated.

As an example, for the two switcher Forward converter disclosed when referring to Circuit 7 of FIG. 8, the maximum output power of the converter will correspond to the output P_S of pin 8 "Pout" of U1 of Circuit 6. As an example, the output of pin 8 of U1 may be P_S=2.5V, P_S is the power sampling voltage. In other words, the scaling on Pin 8 of U1 is such that a 2.5V on Pin 8 will make the converter deliver the maximum output power which is 5 watts, for this example. In this example, the voltage at Pin 3 of U4 (FB) will be scale down from 2.5V to 1.26V by R24 (10 kΩ) and R21 (10.2 kΩ). This 1.26V on Pin 3 of U4 provides the power feedback signal inputs. This Pin 3 of U4 ("FB" pin) is connected to the inverting input of the PWM's internal error amplifier. The non-inverting input of the PWM's internal error amplifier is connected to a 1.26V reference voltage as an example. The PWM's internal high gain error amplifier generates an error signal proportional to the difference between the regulated output power on Pin 3 of U4 "FB" and the reference voltage. The output of the error amplifier is connected to the Pin 4 of U4 "COMP" pin where a Type II network of loop compensation is formed by C6, C7 and R23. This network creates a pole at the origin that rolls off the high DC gain of the amplifier, which is necessary to accurately regulate the output power. A zero provides phase boost near the open loop unity gain frequency, and a high frequency pole attenuates switching noise. It should be noted that the use of poles and zeros as described hereinabove is well known to those of ordinary skill in the art.

The internal PWM current comparator compares the primary current sense signal on the internal current sensor resistor to a referenced current level (determined by the power error signal) and the current error signal is used to change the pulse width.

If the output power is less than 5 watts (in this example 5 W is the set/specified power of the LED load), then the error signal on Pin 4 (COMP) of U4 is less than the internal reference voltage. In this case, the output of internal error amplifier goes more positive and increases the pulse width of the PWM and increasing the output power to achieve the power regulation, and vice versa.

As shown, Circuit 8 ("power output circuit") of FIG. 8 may be an embodiment of the invention as a two-switcher Forward power regulator output. Diode D2 is an output rectifier and D1 is a free wheel diode. Circuit 8 may comprise the following components: L1, diodes D1, D2, D18, D17, capacitors C11, C12, and external LED LOAD. As shown in Circuit 8, D1 and D2 are ultra fast recovery diodes with low reverse-recovery losses. The high frequency filter capacitor C11, and the output filter capacitor C12 attenuate the output voltage ripple and noise spike. The output inductor L1 is selected to ensure Forward converter operates under continuous conducted mode (CCM), as is known to those of ordinary skill in the art.

The output diode D2 rectifies the output voltage of transformer T1 of Circuit 7 (FIG. 8 CONT). The C11 (0.1 uF) and C12 (330 uF) are used to filter high frequency voltage spikes and low frequencies ripples. Thus, C11 and C12 smooth the output DC voltage The Oring diodes D18 and D17 switches the LED load to emergency LED driver or to normal AC driver seamlessly. This makes it not necessary to have an output reset circuit anymore because the LED load either connects to emergency LED driver or connects to normal AC driver seamlessly with no electrical disconnection. In this way, the output of either driver will not see any voltage spike higher than the LED's rated voltage.

Figure 8A:
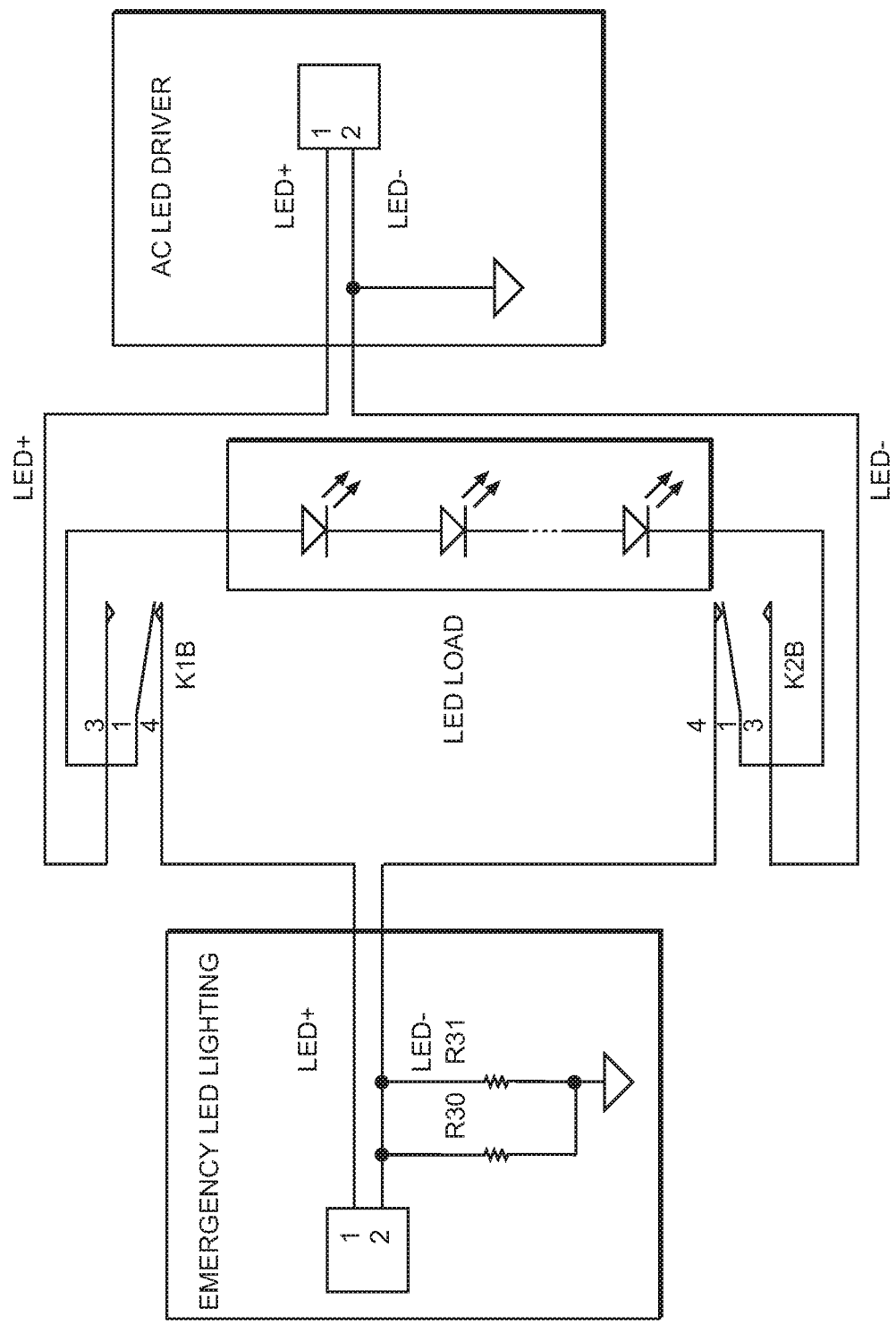
FIG. 8A illustrates a simplified schematic diagram of an emergency LED lighting system and an AC LED driver connected to an LED load via two relays, according to an aspect.

FIG. 8A illustrates a simplified schematic diagram of an emergency LED lighting system and an AC LED driver connected to an LED load via two relays, according to an aspect. As an example, the emergency LED lighting system may be the system disclosed herein and the AC LED driver may be an external third-party device. As shown in FIG. 8A, the voltage potential of the LED's load return power line of the emergency lighting system (EM system) and external AC driver are not equal. In other word, the EM system and external AC driver have different circuit ground voltage levels. To reconcile the difference in voltage potential between the EM system and the AC driver grounds, additional components such as relays K1B and K2B may be required. As shown, the voltage potential of LED− of the external AC driver is usually system/circuit ground.

Figure 9:
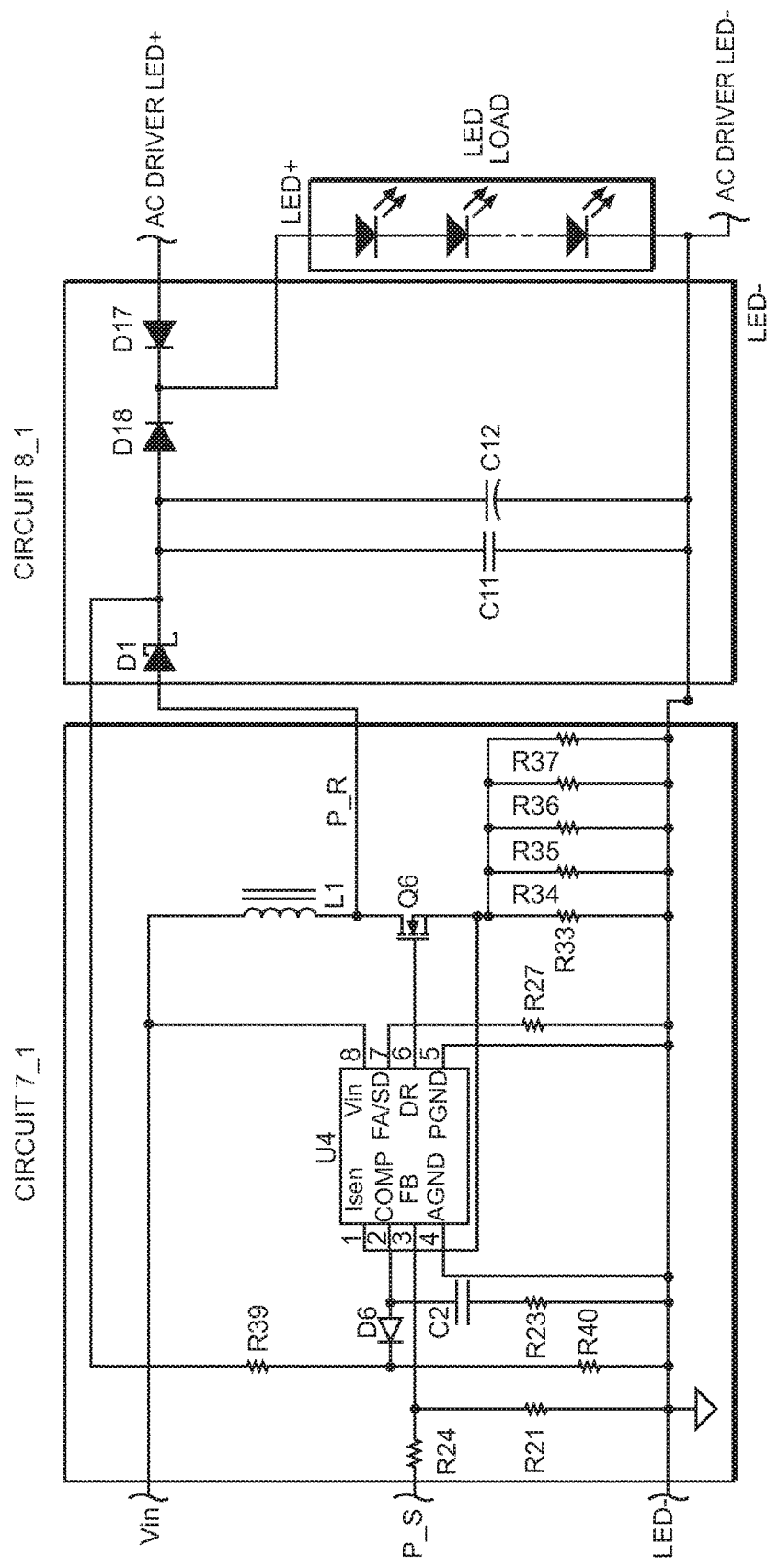
FIG. 9 illustrates a schematic diagram for an alternate embodiment of a power regulation circuit, according to an aspect.
Figure 9A:
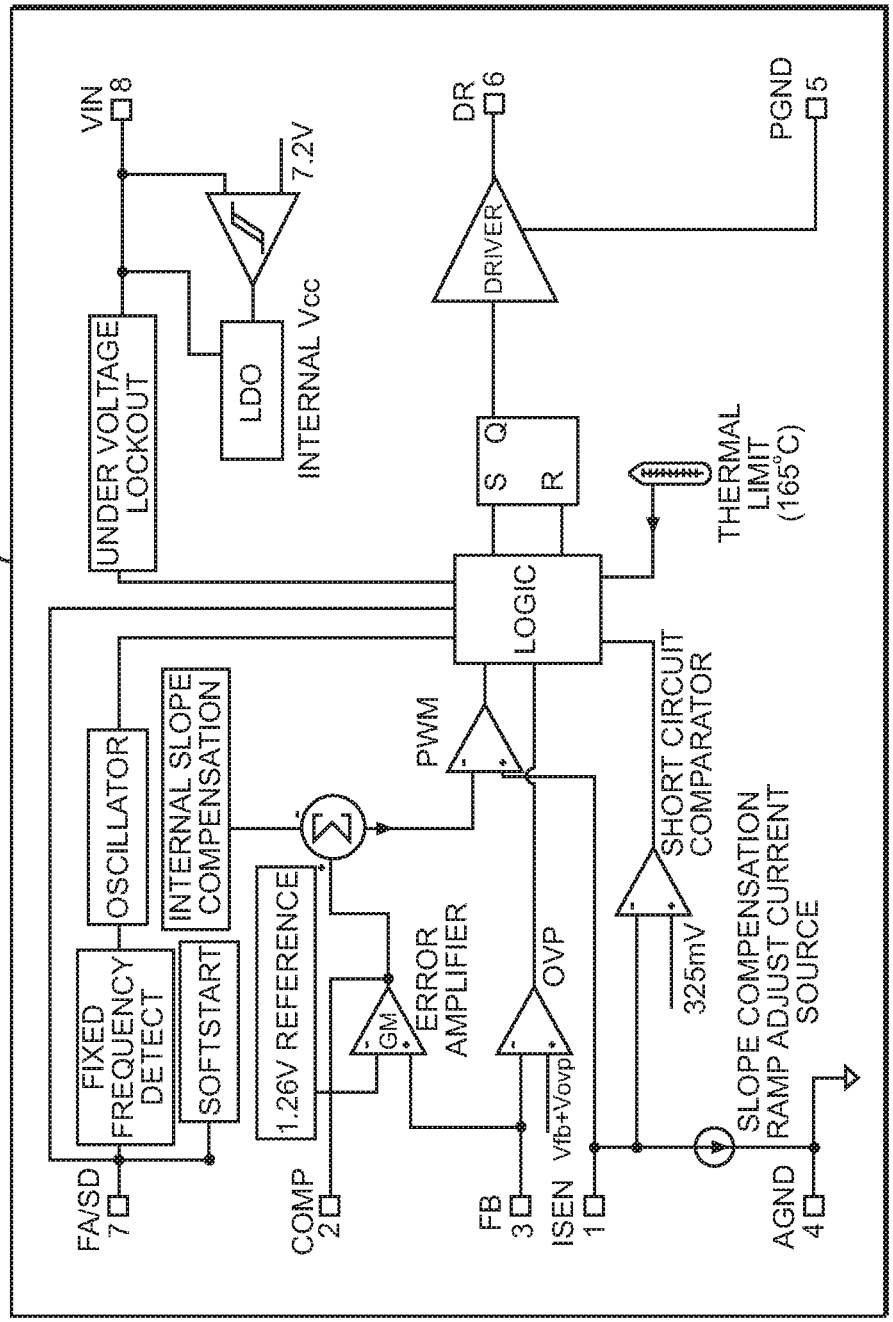
FIG. 9A shows internal detail of a prior art IC chip shown in FIG. 9 as U4.
Figure 10:
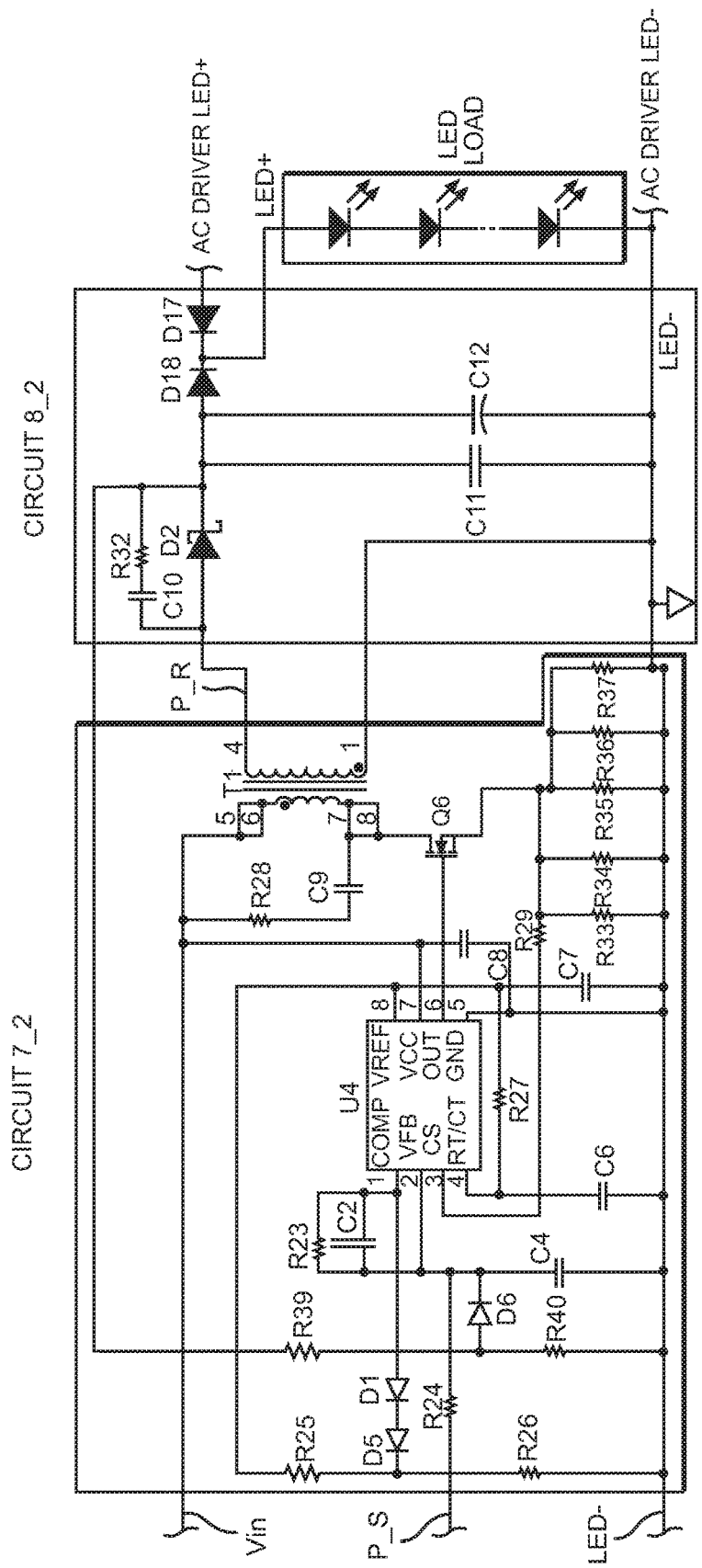
FIG. 10 illustrates a schematic diagram of an alternate embodiment of Flyback regulated power LED driver circuit, according to an aspect.
Figure 11:
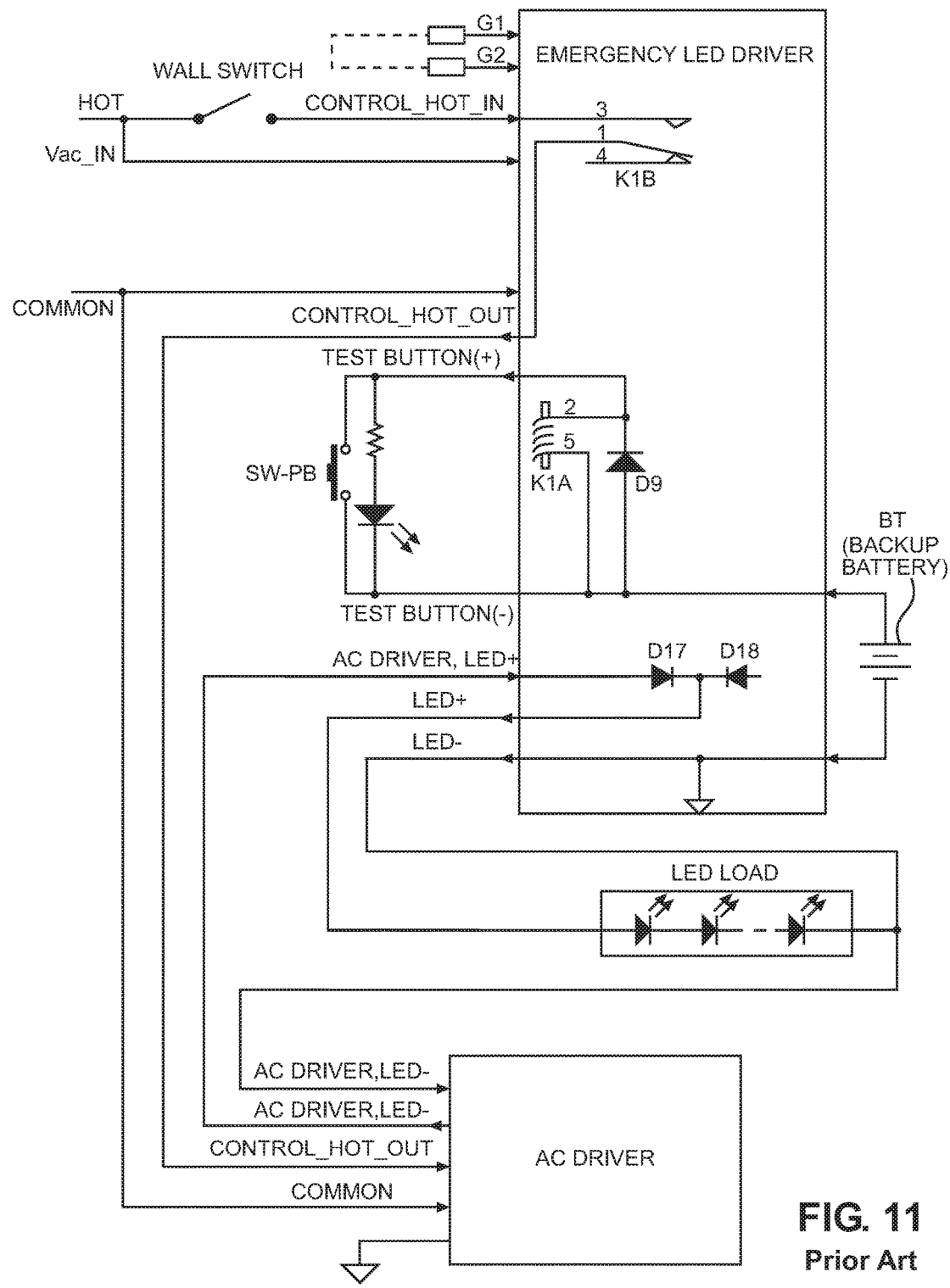
FIG. 11 illustrates the prior art connection of regulated power Emergency LED driver, backup battery, LED load and AC Driver as a completed emergency lighting system, according to an aspect.

As shown in CIRCUIT 8 of FIG. 8 CONT, D18 and D17 may be used, as disclosed when referring to FIGS. 8, 9, and 10. The Oring diodes D18 and D17 switches LED load to emergency LED driver or to normal AC driver seamlessly. This makes it not necessary to have an output reset circuit anymore because the LED load either connects to emergency LED driver or connects to normal AC driver seamlessly with no electrical disconnection. In this way, the output of either driver will not see any voltage spike higher than the LED's rated voltage.

FIG. 9 illustrates a schematic diagram for an alternate embodiment of a power regulation circuit, according to an aspect. It should be noted that the ensuing description refers only to the circuits and circuit components shown in FIG. 9, unless stated otherwise. The schematic of FIG. 9 is a boost regulated power LED driver circuit, for example. This exemplary embodiment may be configured as a 12 Watts boost regulated power LED driver with an output voltage range of 14V~58V.

It should be observed that Circuit 7_1 and Circuit 8_1 in FIG. 9 can replace Circuit 7 and Circuit 8 in FIG. 8 to implement boost converter instead of two switcher Forward converter.

Circuit 7_1 of FIG. 9 shows a boost converter PWM implementation of the power regulation. The following example those of ordinary skill in the art of SMPS. As disclosed hereinabove, in this invention the boost circuit is used to do power regulation instead of only voltage or only current regulation. Circuit 7_1 of FIG. 9 may comprise the following components: R21, R24, R23, R27, R33, R34, R35, R36, R37, R39, R40, D6, U4, C2, L1 and Q6. It should be apparent that the role of Circuit 7_1 of FIG. 9 is to drive output LED strings by providing regulated power, via regulating the product of current and voltage. The R23 (40 kΩ) and C2 (2.2 nF) form an error amplifier compensation circuit and is connected to PIN 2 (COMP) of U4. The power sampling signal input from R24 (10 kΩ) goes into PIN 3 (FB) of the PWM Chip U4 (e.g., LM3478).

Circuit 7_1 of FIG. 9 is stabilized and compensated by a RC network (R23 and C2) and built-in error amplifier of U4 for converter operation. The output signal of the compensation network is a power error signal.

A primary peak current feedback signal may be set by the resistor network (R33 to R37), which feed into PIN 1 (Isen) of U4. The power error signal together with the primary peak current signal generates the pulse width modulation inside U4. This PWM signal is used to achieve the tight regulation of +/−3% of the power output which is a far more superior power regulation than any similar product in the market.

R27 (40 kΩ) is connected to PIN 7 of U4 and sets the switching frequency of 400 kHz for the boost converter.

In CIRCUIT 7_1 of FIG. 9, R39 (453 KΩ) and R40 (15.4 KΩ) resistor divide and voltage offset diode D6 (1N4148) limits the maximum output voltage of LED load to be less than 60V. The reference voltage in internal Op-Amp of U4 is 1.26V and forward voltage on D6 is 0.7V then the voltage on R39 and R40, which is also output LED voltage, can be calculated: (1.26V+0.7V)*(R39+R40)/R40=1.96V*468.4 KΩ/15.4 KΩ=59.6V.

Q6 is a power MOSFET connected to PIN 6 (DR) of U4, which is the driver port. PIN 6 of U4 controls the switching on and off of Q6. This switching on and off of Q6 enables the output power to be regulated.

L1 is a boost inductor. It is used to store and deliver power to the output LED loads.

It is well known to those skilled in the art that for a boost converter:

$$Ro = Vo/Io \tag{5}$$

Ro is the output impedance, Vo is the output voltage and Io is the output current.

$$Vo = Vin/(1-D) \tag{6}$$

Vo is the output voltage, Vin is the input battery voltage.

where D is duty cycle. For maximum output voltage range, the maximum and minimum duty cycle and turns ratio must be calculated. For example, for maximum output voltage of 58V (Vo), when minimum input voltage is 8.4V (Vin), then the maximum duty cycle D is 0.855. When the output voltage is 14V, and input voltage is 12V the minimum duty cycle is 0.143. The duty cycle should be within a practical range for proper operation. It is between 1 and 0.

$$Io = Iin*(1-D) \tag{7}$$

Replace (6) and (7) to (5) the $$Rin = Vin/Iin = [Vo*(1-D)]/[Io/(1-D)] = (Vo/Io)*(1-D)^2 \tag{8}$$

Where Vo/Io=Ro in (5) and manipulate (5) become $$Rin = Ro*(1-D)^2 \tag{9}$$

(9) shows the load resistance Ro is reflected to input Rin by $(1-D)^2$.

Input power can express $$Pin = (Vin^2)/Rin \tag{10}$$

From (9), (10) uses duty cycle D can change Rin leads to change input power.

$$Po = Pin - Ploss \tag{11}$$

The above equations (5-11) show that by controlling the duty cycle (D) with the power feedback network, we can regulate the output power Po.

As an example, U4 (e.g., LM3478) device is a fixed frequency, Pulse Width Modulated (PWM) current mode controller integrated circuit chip. The inductor's peak current through the external MOSFET is sensed through an external sense resistor R33-R37 (0.053Ω). The voltage across current resistor is fed into the ISEN pin. This voltage is fed into the positive input of the PWM comparator. The input power sampling in the form of voltage is taken through a feedback resistor divider R24(10 kΩ) and R21(10.2 kΩ) which scale input power sampling down to 1.26V. This signal is fed into the error amplifier negative input which is the feedback pin, Pin 3 of U4 (FB). This Pin 3 of U4 ("FB" pin) is connected to the inverting input of the PWM's internal error amplifier. The non-inverting input of the PWM's internal error amplifier is connected to a 1.26V reference voltage as an example.

In Circuit 7_1 of FIG. 9, U4 (a PWM IC chip) is used to perform the function of power regulation and voltage boosting based on the inputs it receives from Circuit 6 of FIG. 8 Essentially, Circuit 7_1 of FIG. 9 shows how to use a prior art PWM boost circuit to work as a power regulated circuit.

As shown, Circuit 8_1 of FIG. 9 may be a Boost power regulator. Circuit 8_1 of FIG. 9 may comprise the following components: D1, D18, D17, C11 and C12. Diode D1 may be an output rectifier diode. D1 is an ultra fast recovery diode with low reverse-recovery losses. The high frequency filter capacitor C11, and the output filter capacitor C12 attenuate output voltage ripple and noise spike.

The output diode D1 rectifies the output voltage from L1 of Circuit 7_1. The C11 (0.1 uF) and C12 (330 uF) are used to filter high frequency voltage spikes and low frequencies ripples. C11 and C12 smooth the output DC voltage. The output circuit in Circuit 8_1 of FIG. 9, may comprise the Oring diodes D18 and D17 switches LED load to emergency LED driver or to normal AC driver seamlessly. This makes it not necessary to have an output reset circuit anymore because the LED load either connects to emergency LED driver or connects to normal AC driver seamlessly with no electrical disconnection. In this way, the output of either driver will not see any voltage spike higher than the LED's rated voltage.

FIG. 10 illustrates a schematic diagram of an alternate embodiment of Flyback regulated power LED driver circuit, according to an aspect. It should be noted that the ensuing description refers only to the circuits and circuit components shown in FIG. 10, unless stated otherwise. This exemplary embodiment may be configured as a 15 Watts flyback regulated power LED driver with an output voltage range of 10V~58V.

It should be noted that Circuit 7_2 of FIG. 10 is fixed frequency PWM controller circuits for DC-DC converter. The PWM controller provides full compensated Error Amplifier, current sense comparator and a totem pole output driver. It should be understood that Circuits 7_2 of FIG. 10 and 8_2 of FIG. 10 may replace Circuits 7 and 8 of FIG. 8, respectively.

The PWM portion of Circuit 7_2 of FIG. 10 may comprise the following components: R25, R23, R24, R28, R26, R27, R29, R39, R40, R33, R34, R35, R36, R37, D1, D5, D6, U4, Q6, C4, C6, C7, C8, C9, C2 and T1. It should be apparent that the role of Circuit 7_2 of FIG. 10 is to drive output LED strings by providing regulated power. As an example, the R24 (1 kΩ), C2 (0.1 uF), R23 (100 kΩ) and error amplifier inside of U4 (e.g., UC3845B) form a negative feedback circuit to compensate power error, i.e., form a power compensation network. As shown in FIG. 10, the input to Pin 2 Vfb of U4 is from the input power sampling P_S. A disclosed hereinbefore, the power sampling signal P_S is from Pin 8 ("Pout") of U1 in Circuit 6 of FIG. 8. The Input power sampling does not need to be scaled down because the reference voltage is already at 2.5V instead of 1.26V as in Circuit 7 of FIG. 8 and Circuit 7_1 of FIG. 9. The power sampling compares reference voltage 2.5V on the non-inverter port of an error amplifier inside of U4 to generate power error signal. The power compensation network has a DC gain of 100 (R23/R24) or 40 dB and a –20 dB slope of the AC gain (R23/R24)/(1+2*π*f*C2*R23). Where f is any frequency that appears in the circuit coming from the semiconductor switching, from harmonics and from circuit noise. The gain corner frequency is 16 Hz, which is 1/(2*π*C2*R23). This compensation RC network (R24, C2 and R23) together with the built-in error amplifier of U4 (e.g., UC3845B) generates power error signal. This compensation circuit to stabilize the output DC power and attenuate high frequency disturbing.

The output signal of the power compensation network is a power error signal. This power error signal is connected to PIN 1 (COMP) of U4.

The primary current feedback signal is generated by the resistor networks (R33 to R37) and through R29 is connected to PIN 3 (CS) of U4.

Referring to FIG. 10, CIRCUIT 7_2, the power error signal is connected to PIN 2 (VFB) passing through R24 and primary current feedback is connected to PIN 3 (CS) of U4. Internal to the PWM chip, these signals on PIN 1 (COMP) and PIN 3 (CS) are the inputs of the built-in comparator used to generate pulse width modulation (PWM) signal on PIN 6 (OUT) of U4. The internal workings of the PWM IC chip are a well-known to those ordinary skill in the art, and therefore are not fully disclosed here. The output of the PWM IC chip (PIN 6), which is a modulated pulse width signal, turns on and turns off the power MOSFET (Q6) to achieve a tight power regulation of +/–3%, thus providing a better adaptive power regulation.

As an example, C6 (1000 pF) and R27 (10 kΩ) resistor connected to pin 4 and pin 8 of U4 are used to set the oscillation frequency of the flyback converter. The oscillation frequency is 1.72/(R27*C6).

C7 (0.01 uF) is a bypass capacitor for the reference voltage output which is PIN 8 (Vref) of U4.

C8 (1 uF), a ceramic capacitor is used as a bypass capacitor for Vcc which is PIN 7 of U4.

The clamping circuit includes resistors R25 (100 kΩ), R26 (34 kΩ), D1 (B160-13-F) and D5(B160-13-F). The clamping voltage is 1V*R26/(R26+R25). As an example, the clamping circuit clamps peak voltage in current sensing resistor from 1V to 0.25 V by selecting R25 and R26 value. It greatly reduces power loss on current sensing resistor.

Circuit 7_2 of FIG. 10 is a Flyback adaptive converter to implement the regulated constant power LED driver.

The Flyback converter comprises components: R28, R29, R33, R34, R35, R36, R37, R39, R40, D6, T1, Q6, C4 and C9. As an example, the R28 (4.3Ω) and C9 (2200 pF) provide snubbing on the primary winding of T1 to attenuate the voltage spike generated by transformer's leakage inductance on primary winding of T1. Q6 is power switching NMOSFET controlled by output PIN 6 (OUT) of U4. The R33, R34, R35, R36 and R37 resistor network is the primary inductance current sensing resistors. The resistors R33-37 selected in this example are 0.24 Ω to achieve a 15 W constant power output. It should be understood that different resistor values are needed for different output power. C4 (33 pF) filters high frequency noise spike on power feedback signal.

T1 is a Flyback power transformer. T1 delivers primary power to secondary LED load. The primary and secondary windings in the Flyback transformer (T1) conduct current at different times. The Flyback transformer operates as an inductor when the primary winding is conducting. The primary to secondary ampere-turns ratio is conserved in this conducting mode. The voltage transformation is taking place between primary and secondary windings of T1, whereby the secondary voltage is reflected to the primary winding during transistor Q6 turn off time.

The maximum output voltage clamps to 60V by R39 (453 kΩ), R40 (21.5 kΩ) and D6 (B160-13-F).

Circuit 8_2 of FIG. 10 illustrates a schematic for Flyback regulated power LED driver output circuit. Circuit 8_2 may comprise the following components: R32, D2, D18, D17, C10, C11, C12, and external LED LOAD In Circuit 8_2, the power feedback, primary current feedback and power compensation network changes the pulse width to regulate the output power deliverable from primary winding's stored power. The C10 (100 pF) and R32 (475Ω) is the snubber on output diode D2 to attenuate voltage spike generated by transformer leakage inductance on secondary winding of transformer T1.

The output diode D2 rectifies the output voltage of transformer T1 of Circuit 7_2. The C11 (0.1 uF) and C12 (680 uF) are used to filter high frequency voltage spikes and low frequencies ripples. C11 and C12 smooth the output DC voltage. Oring diodes D18 and D17 switches LED load to emergency LED driver or to normal AC driver seamlessly. This makes it not necessary to have an output reset circuit anymore because the LED load either connects to emergency LED driver or connects to normal AC driver seamlessly with no electrical disconnection. In this way, the output of either driver will not see any voltage spike higher than the LED's rated voltage.

The invention has been described with respect to several sample embodiments. Those having skill in the art will recognize that additional embodiments will be within the scope of this invention. The invention is not limited by the description of these sample embodiments, but instead of that defined in accordance with the claims. For example, it can be recognized that one can design, similarly as described herein, modified LED drivers to regulate 5-watt, 7-watt, 10-watt, 12-watt, 15 watts, 20 watts, etc. with operating output voltage from 10V to 58V.

A power feedback closed loop and power compensation technique as disclosed herein results in a tighter regulated constant power converter. Typically, a +/−3% or better power regulation error can be achieve using this novel invention. Further, this novel power control technique tightens the regulated power on output load under various input voltage and output LED load conditions.

Since the constant power LED driver's output current and voltage are variables, they shall not be used for power regulation individually. Therefore, the error signal cannot be taken from output current sampling and output voltage sampling, individually. To regulate output power, the error signal input to error amplifier should be the output or input power sampling as described herein.

In some embodiments, the driver circuits disclosed herein use analog multiplier to multiply two independent components: one of voltage input, which is converted from output current sampling and another of voltage input, which is the output voltage sampling. The product of the two independent components is the output power sampling, in the form of voltage signal. The disclosed circuits then compare the output power sampling value to a reference fixed value inside the PWM for example to generate a power error signal. This power error signal inputs to power feedback loop. The power error signal combining with the primary current feedback signal generates the variable pulse width to regulate the output, as described herein.

Again, the LED driver circuit disclosed herein is versatile and advantageous in that this topology is suitable to two-switch Forward converter, Boost converter and Flyback converter in continuous conducted mode (CCM) or discontinuous conducted mode (DCM) Flyback converter, to mention just a few.

Further, as disclosed herein, the LED driver circuit uses power feedback and power compensation loop to control pulse width modulation (PWM) to achieve precise power regulation. An analog multiplier generates power sample signal from samplings of input or output current and input or output voltage for power regulation. This technology can regulate output power within +/−3% and thus automatically results in higher yield in mass production of these type of driver circuits.

The values (or component type or part number) of the circuit components described throughout this disclosure (e.g., R28, 4.3 Ω and C9, 2200 pF) are only examples particular to the examples of circuit configurations disclosed herein. Thus, unless otherwise expressly stated herein, it should be understood that logical deviations from these values and examples may be made while still obtaining similar results.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A regulated power LED driver circuit comprising:
a power sampling circuit comprising:
an analog multiplier that generates an input power sampling signal in the form of voltage signal by multiplying samplings of input current and input voltage;
wherein the input current sampling is a differential signal that is inputted directly into differential ports of the analog multiplier;
a power regulation circuit electrically connected to the power sampling circuit and comprising:
a voltage divider that scales down the input power sampling signal;
a compensation network adapted to receive the scaled-down input power sampling signal from the first circuit and comprising a resistor-capacitor (RC) network;
a comparator that generates a power error signal by comparing the scaled-down input power sample signal with a reference voltage;
a resistor adapted to provide a primary current feedback signal;
a switcher; and
a pulse width modulation (PWM) comparator that receives as inputs the power error signal and the primary current feedback signal and generates a modulated pulse width signal and thus controls the switcher's turning ON and OFF, to regulate the output power of the LED driver circuit; and
a power output circuit electrically connected to the power regulation circuit and comprising Oring diodes to switch between the regulated output power of the LED driver circuit and power from an external AC driver.

2. The regulated power LED driver circuit of claim 1 wherein the switcher is a power MOSFET.

3. The regulated power LED driver circuit of claim 1 wherein the power regulation is adapted to increase pulse width when output power is lower than a set power of an LED load and to decrease the pulse width when the output power is higher than the set power of the LED load.

4. The regulated power LED driver circuit of claim 1 further comprising one of a transformer and an output inductor.

5. The regulated power LED driver circuit of claim 1 further comprising a low battery shut down circuit.

6. The regulated power LED driver circuit of claim 5 further comprising a battery charge and discharge management circuit.

7. The regulated power LED driver circuit of claim 6 further comprising an output rectifier and filter circuit.

8. The regulated power LED driver circuit of claim 7 further comprising a single stage power factor correction circuit.

9. The regulated power LED driver circuit of claim 8 further comprising a line filter, surge suppression and bridge rectifier circuit.

10. A regulated power LED driver circuit comprising:
a power sampling circuit comprising an analog multiplier and being adapted to generate an input power sample signal by multiplying samplings of input current and input voltage, wherein the input current sampling is a differential signal that is inputted directly into differential ports RS+ and RS− of the analog multiplier; and
a power regulation circuit comprising a pulse width modulation (PWM) comparator and being electrically connected to the power sampling circuit, the power regulation circuit being adapted to receive the input power sample signal from the power sampling circuit in the form of voltage signal, generate a power error signal by comparing the input power sample signal with a reference voltage and determine output power level based on the power error signal and a primary current signal.

11. A method of power regulation of an LED driver circuit, the circuit comprising an analog multiplier electrically connected to a pulse width modulation (PWM) comparator, the method comprising: generating an input power sampling signal in form of voltage signal by multiplying samplings of input current and input voltage of the driver circuit; generating a power error signal by comparing the input power sampling signal with a reference voltage; and determining output power level based on the power error signal and a primary current signal.

12. The method of claim 11 further comprising using a voltage divider to scale down the input power sampling signal.

13. The method of claim 12 further comprising using a compensation network to receive the scaled-down input power sampling signal.

14. The method of claim 13 further comprising generating a modulated pulse width signal to control a switcher's turning ON and OFF, thus regulating the output power of the LED driver circuit.

15. The method of claim 14 further comprising connecting the input current sampling directly into differential ports RS+ and RS− of the analog multiplier.

16. The method of claim 15 further comprising providing an output reset circuit being adapted to switch between the output power of the LED driver circuit and power from an external AC driver.

* * * * *